United States Patent
Oki et al.

(10) Patent No.: US 10,280,001 B2
(45) Date of Patent: May 7, 2019

(54) BIN-MODULE BASED AUTOMATED STORAGE AND RETRIEVAL SYSTEM AND METHOD

(71) Applicant: Amazon Technologies, Inc., Reno, NV (US)

(72) Inventors: Nobuaki Oki, Seattle, WA (US); Masayuki Ataka, Seattle, WA (US); Chie Sato, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 575 days.

(21) Appl. No.: 14/442,027

(22) PCT Filed: Nov. 15, 2012

(86) PCT No.: PCT/US2012/065296
§ 371 (c)(1),
(2) Date: May 11, 2015

(87) PCT Pub. No.: WO2014/077819
PCT Pub. Date: May 22, 2014

(65) Prior Publication Data
US 2015/0291356 A1    Oct. 15, 2015

(51) Int. Cl.
*B65G 1/137* (2006.01)
*B65G 1/04* (2006.01)
(Continued)

(52) U.S. Cl.
CPC .......... *B65G 1/137* (2013.01); *B65G 1/0407* (2013.01); *B65G 1/0435* (2013.01); *B65G 1/06* (2013.01);
(Continued)

(58) Field of Classification Search
CPC .... B65G 1/137; B65G 1/0407; B65G 1/0435; B65G 1/06; B65G 1/1378
See application file for complete search history.

(56) References Cited

U.S. PATENT DOCUMENTS 3,432,045 A    3/1969    Bauer
3,782,565 A    1/1974    Doran et al.
(Continued)

FOREIGN PATENT DOCUMENTS

DE    20112328 U1    3/2002
DE    20211321 U1    2/2003
(Continued)

OTHER PUBLICATIONS

Extended European Search Report dated Jun. 8, 2016, for corresponding EP Application No. 2888382.4-1707/2920684, 9 pages.
(Continued)

*Primary Examiner* — Kaitlin S Joerger
(74) *Attorney, Agent, or Firm* — Eversheds Sutherland (US) LLP

(57) ABSTRACT

A bin-module based automated storage and retrieval system (ASRS) includes a plurality of storage shelves, each removably supporting a plurality of bin modules. Each bin module includes multiple bins. The system also includes a collection shelf configured to removably support bin modules. The system further includes a dolly including: (a) a dolly frame, (b) a drive module configured to propel the dolly, and (c) an actuator configured to move a coupler to couple to the bin module supported in one of the plurality of storage shelves when the dolly is positioned adjacent to said storage shelf, the actuator being further configured to remove said bin module from said storage shelf to the dolly frame, and to
(Continued)

move said bin module from the dolly frame to the collection shelf when the dolly is positioned adjacent to the collection shelf.

18 Claims, 14 Drawing Sheets

(51) Int. Cl.
   *B65G 1/06* (2006.01)
   *B65G 65/00* (2006.01)
   *B65G 65/08* (2006.01)
   *G05B 15/02* (2006.01)

(52) U.S. Cl.
   CPC ......... *B65G 1/1378* (2013.01); *B65G 65/005* (2013.01); *B65G 65/08* (2013.01); *G05B 15/02* (2013.01); *B65G 2201/02* (2013.01); *B65G 2203/0283* (2013.01); *B65G 2209/04* (2013.01)

(56) References Cited

U.S. PATENT DOCUMENTS

| | | | | |
|---|---|---|---|---|
| 3,809,259 | A * | 5/1974 | Pipes | B65G 1/0435 414/280 |
| 4,007,846 | A * | 2/1977 | Pipes | B65G 1/0435 414/280 |
| 4,148,404 | A * | 4/1979 | Heisler | B66B 11/006 414/259 |
| 4,856,956 | A | 8/1989 | Zur | |
| 4,932,828 | A * | 6/1990 | Katae | B23P 19/001 414/273 |
| 5,379,229 | A * | 1/1995 | Parsons | B65G 1/1378 414/273 |
| 6,061,607 | A * | 5/2000 | Bradley | B65G 1/1376 414/273 |
| 6,377,867 | B1 | 4/2002 | Bradley et al. | |
| 7,261,509 | B2 * | 8/2007 | Freudelsperger | B65G 1/0407 414/269 |
| 7,963,384 | B2 * | 6/2011 | Lafontaine | B65G 1/1378 198/347.4 |
| 8,327,609 | B2 * | 12/2012 | Krizmanic | B65G 1/1378 414/266 |
| 8,956,099 | B2 * | 2/2015 | Olszak | B66F 9/07 414/277 |
| 9,205,981 | B2 * | 12/2015 | Valentin | B65G 1/1373 |
| 9,315,323 | B2 * | 4/2016 | Schubilske | G05B 15/02 |
| 9,514,430 | B2 * | 12/2016 | Miette | B07C 3/02 |
| 9,604,781 | B2 * | 3/2017 | Stevens | B65G 1/1373 |
| 2003/0091411 | A1 * | 5/2003 | Diehm | B65G 1/0435 414/280 |
| 2004/0197171 | A1 | 10/2004 | Freudelsperger | |
| 2008/0044266 | A1 | 2/2008 | Neeper et al. | |
| 2009/0324378 | A1 * | 12/2009 | Schafer | B65G 1/1378 414/795.9 |
| 2010/0300048 | A1 | 12/2010 | Krizmanic et al. | |
| 2010/0322747 | A1 | 12/2010 | Lert et al. | |
| 2011/0014018 | A1 * | 1/2011 | van Ooyen | B65G 1/0435 414/280 |
| 2011/0033270 | A1 * | 2/2011 | Toncelli | B65G 1/0407 414/277 |
| 2011/0262253 | A1 * | 10/2011 | Krizmanic | B60L 11/1811 414/279 |
| 2013/0078064 | A1 * | 3/2013 | Kostmann | B65G 1/0435 414/277 |

FOREIGN PATENT DOCUMENTS

| | | |
|---|---|---|
| JP | S5285291 U | 6/1977 |
| JP | S59203001 A | 11/1984 |
| JP | 61-150908 A | 7/1986 |
| JP | H0342402 A | 2/1991 |
| JP | H03-095304 U | 9/1991 |
| JP | 7-81706 A | 3/1995 |
| JP | H07285616 A | 10/1995 |
| JP | 9-290902 A | 11/1997 |
| JP | 2012-211019 A | 11/2012 |
| WO | 2008152245 A2 | 12/2008 |

OTHER PUBLICATIONS

Warehouselogistics. Retail Warehouse Logistics Picking System for Supermarket Delivery. YouTube. Dec. 18, 2009. [retrieved on Jan. 10, 2013]. Retrieved from the intranet: <URL: http://www.youtube.com/watch?v=6UXQRHObj1Q>.
International Search Report and Written Opinion dated Feb. 3, 2015, for corresponding International Application No. PCT/US2012/065296, 17 pages.

* cited by examiner

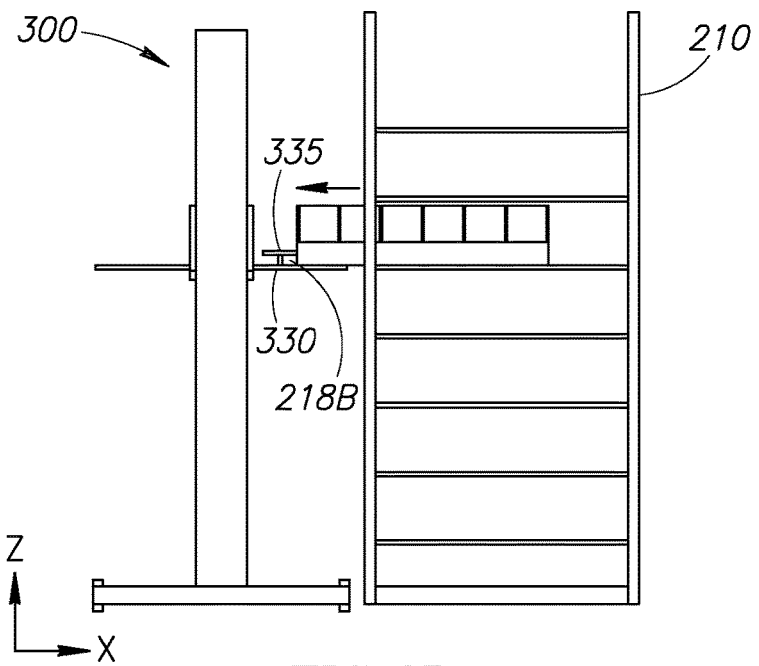
FIG.6D
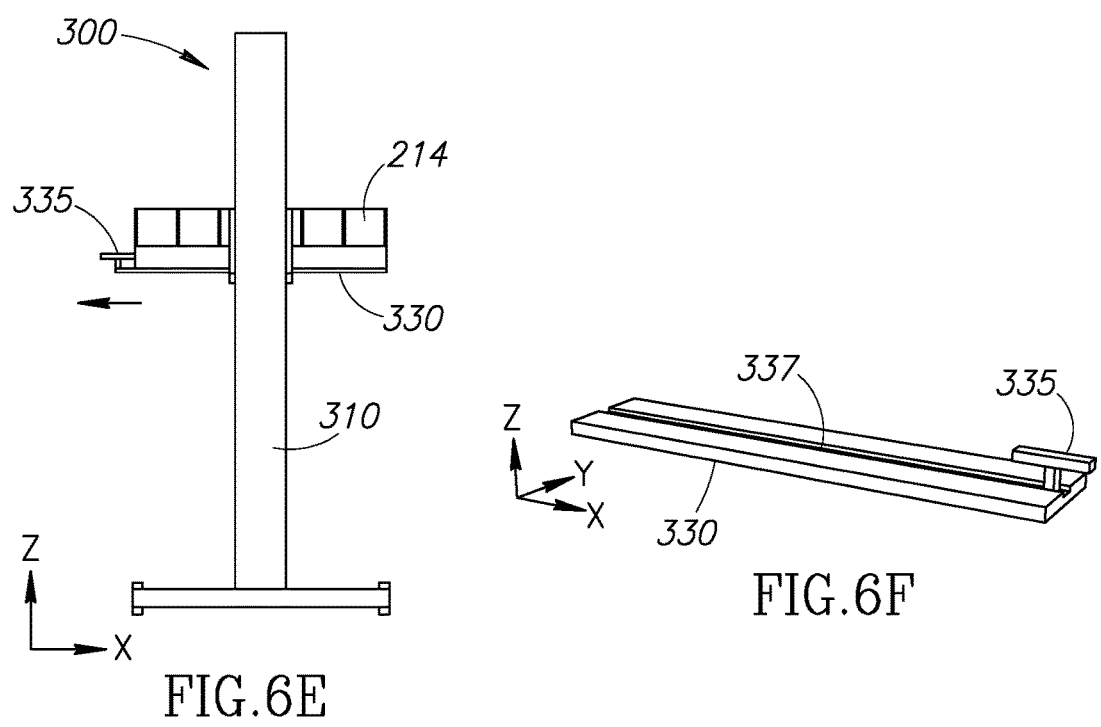
FIG.6E
FIG.6F

BIN-MODULE BASED AUTOMATED STORAGE AND RETRIEVAL SYSTEM AND METHOD

BACKGROUND

Electronic marketplaces, such as those accessible via the Internet, may include a catalog of items or products available for purchase. These items may be offered as the basis for commerce (e.g., sale or trade). In one example, customers may utilize a web browser to visit a merchant's website, select an item for purchase from the catalog, and engage in a checkout process to finalize an order for the item. The merchant may operate a fulfillment network including various facilities in order to process such orders. For instance, the merchant may operate an automated storage and retrieval system (ASRS) that is capable of automatically or semi-automatically retrieving purchased items in an inventory workspace to fulfill orders. The retrieved items are then automatically, semi-automatically, or manually prepared for shipments to the respective purchasing customers. The present invention is directed to providing an ASRS and related methods, which are fast, accurate, and efficient in their use of an inventory workspace particularly when the workspace area is limited.

BRIEF DESCRIPTION OF THE DRAWINGS

FIGS. 5E to 5B illustrate a reverse operation of moving the bin module from the dolly frame to a shelf.

FIGS. 6A-6E illustrate a sample operation of a dolly according to another embodiment, which retrieves a removable bin module from a storage shelf and moves it to a dolly frame. FIGS. 6E to 6B illustrate a reverse operation of moving the bin module from the dolly frame to a shelf.

FIG. 6F is a perspective view of an embodiment of a coupler suitable for use in the dolly of FIGS. 6A-6E, wherein the coupler includes a T-shape hook slidably supported in an arm.

FIGS. 8D to 8A illustrate a reverse operation of removing the bin module from the shelf and vertically (upwardly) moving the bin module to an upper level.

While the systems and methods for transporting inventory are described herein by way of several embodiments and illustrative drawings, those skilled in the art will recognize that the systems and methods for transporting inventory are not limited to the embodiments or drawings described. It should be understood that the drawings and detailed description thereto are not intended to limit the systems and methods for transporting inventory to the particular form disclosed, but on the contrary, the invention is to cover all modifications, equivalents and alternatives falling within the scope of the systems and methods for transporting inventory as defined in the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
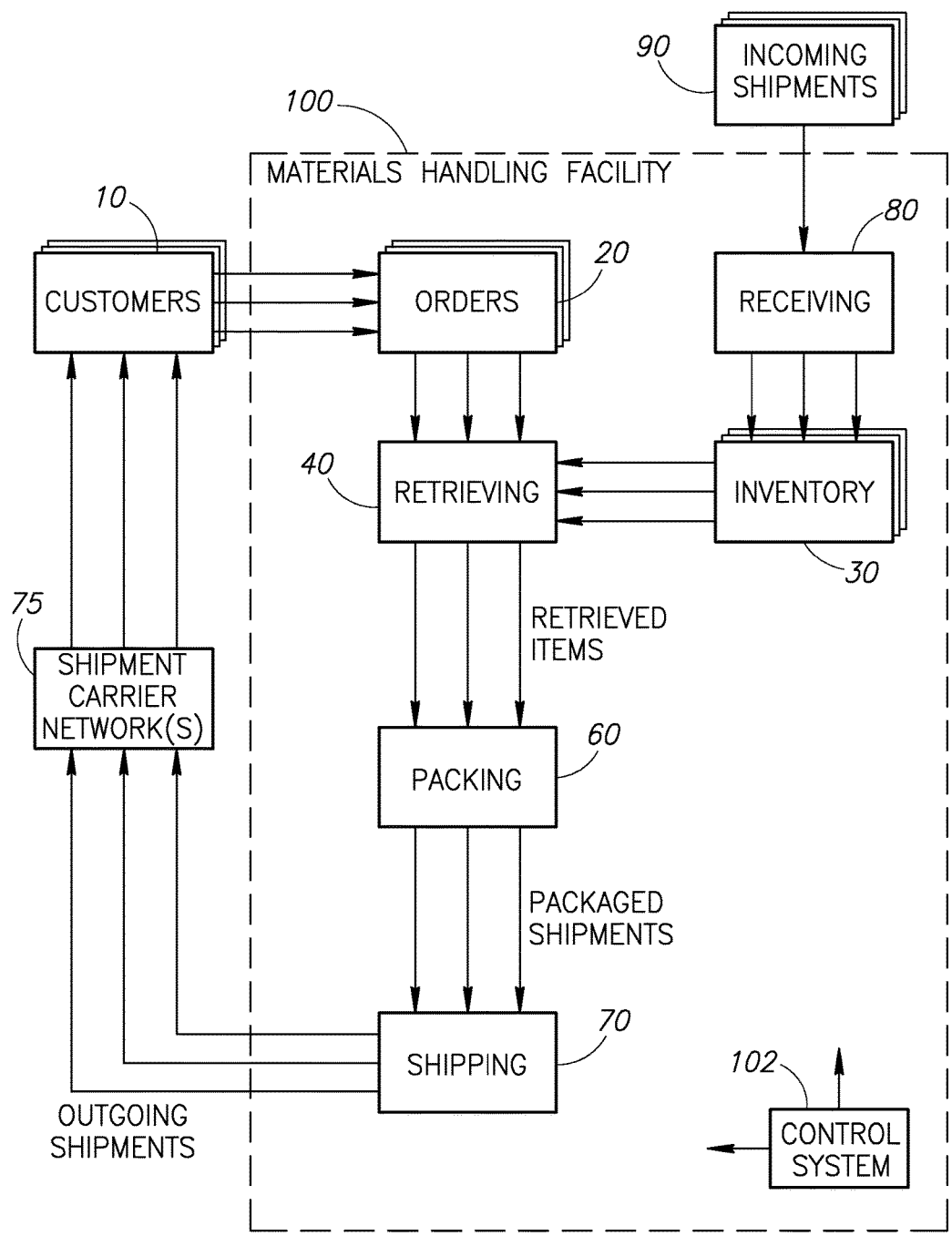
FIG. 1 is a logical representation of the operations of a materials handling facility, according to some embodiments.

Various embodiments of a system and method for transporting inventory in a materials handling facility are described. FIG. 1 illustrates a logical representation of the operation of an exemplary materials handling facility 100, in which the system and method for transporting inventory according to various embodiments may be used.

FIG. 1 illustrates an exemplary order fulfillment center of a product distributor. Multiple customers 10 may submit orders 20 to the product distributor through an ecommerce portal or other electronic marketplace, wherein each order 20 specifies one or more items from inventory 30 to be shipped to the customer that submitted the order. The inventory 30 includes incoming shipments 90 that have gone through receiving 80. To fulfill the customer orders 20, the one or more items specified in each order are automatically retrieved from inventory 30 (or a stock storage) in the materials handling facility, as indicated at 40. Retrieved items may then be sent to packing 60, shipping 70, and finally via shipment carrier network(s) 75 to the purchasing customers 10. In various embodiments, the system and method for transporting inventory according to the present invention may be used mainly in the retrieving 40 of items from the inventory 30 followed by the packing 60 of retrieved items. As applied in a materials handling facility 100, the present invention according to various embodiments realizes an automated storage and retrieval system (ASRS) that is highly efficient in quickly retrieving purchased items for further processing (e.g., packing). As shown in FIG. 1, a control system 102 is provided to control automatic operation of the ASRS according to various embodiments. Configuration of the control system 102 will be more fully described later in reference to FIG. 11.

Figure 2:
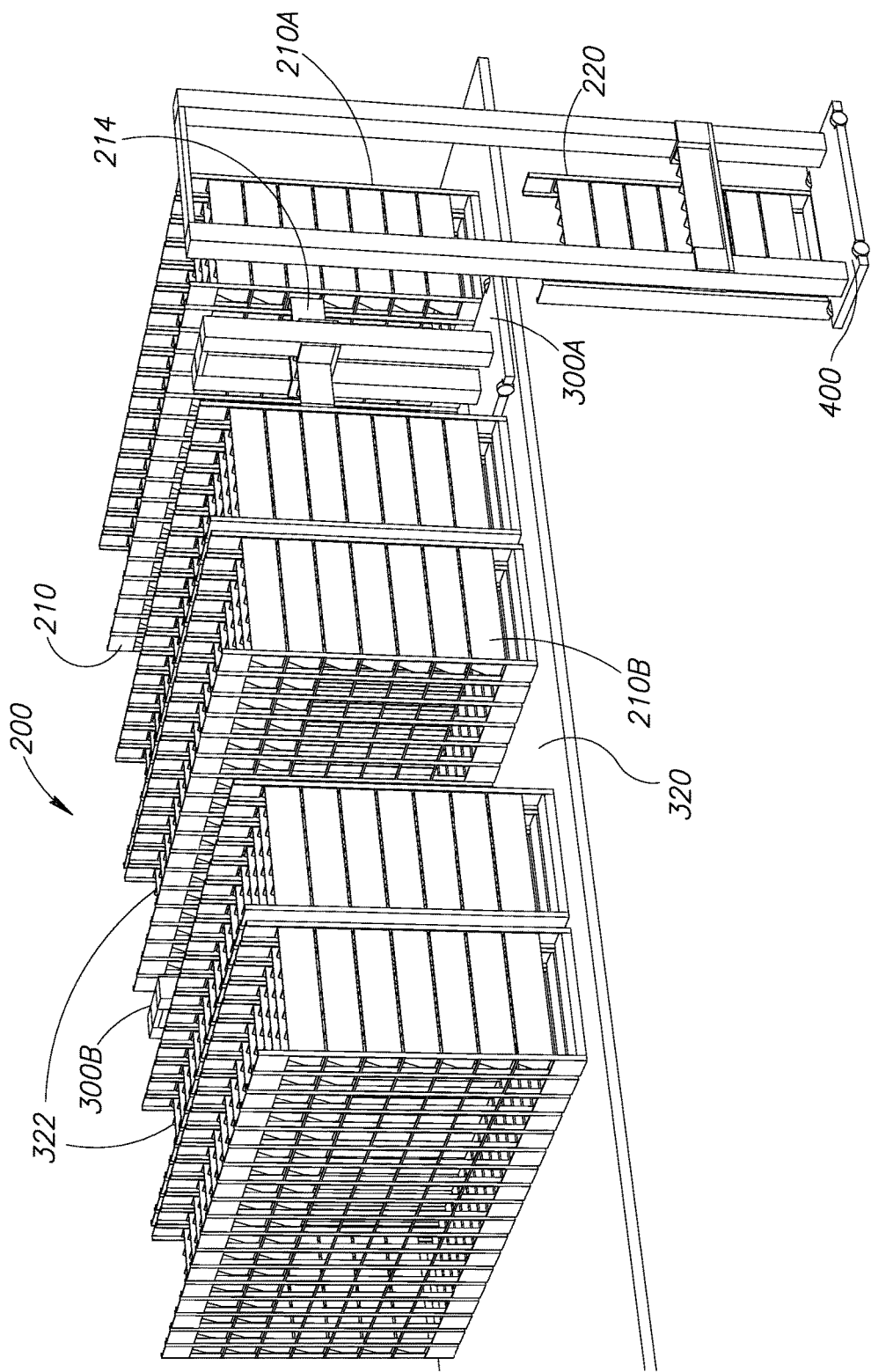
FIG. 2 is a perspective view of a system for transporting inventory according to an embodiment of the present invention, wherein the system includes a plurality of storage shelves, dollies that move between the shelves, and an elevator.

FIG. 2 is a perspective view of a system 200 for transporting inventory according to exemplary embodiments. The system 200 includes a plurality of storage shelves 210, dollies 300A and 300B that move between the shelves 210, and an elevator 400.

Figure 3:
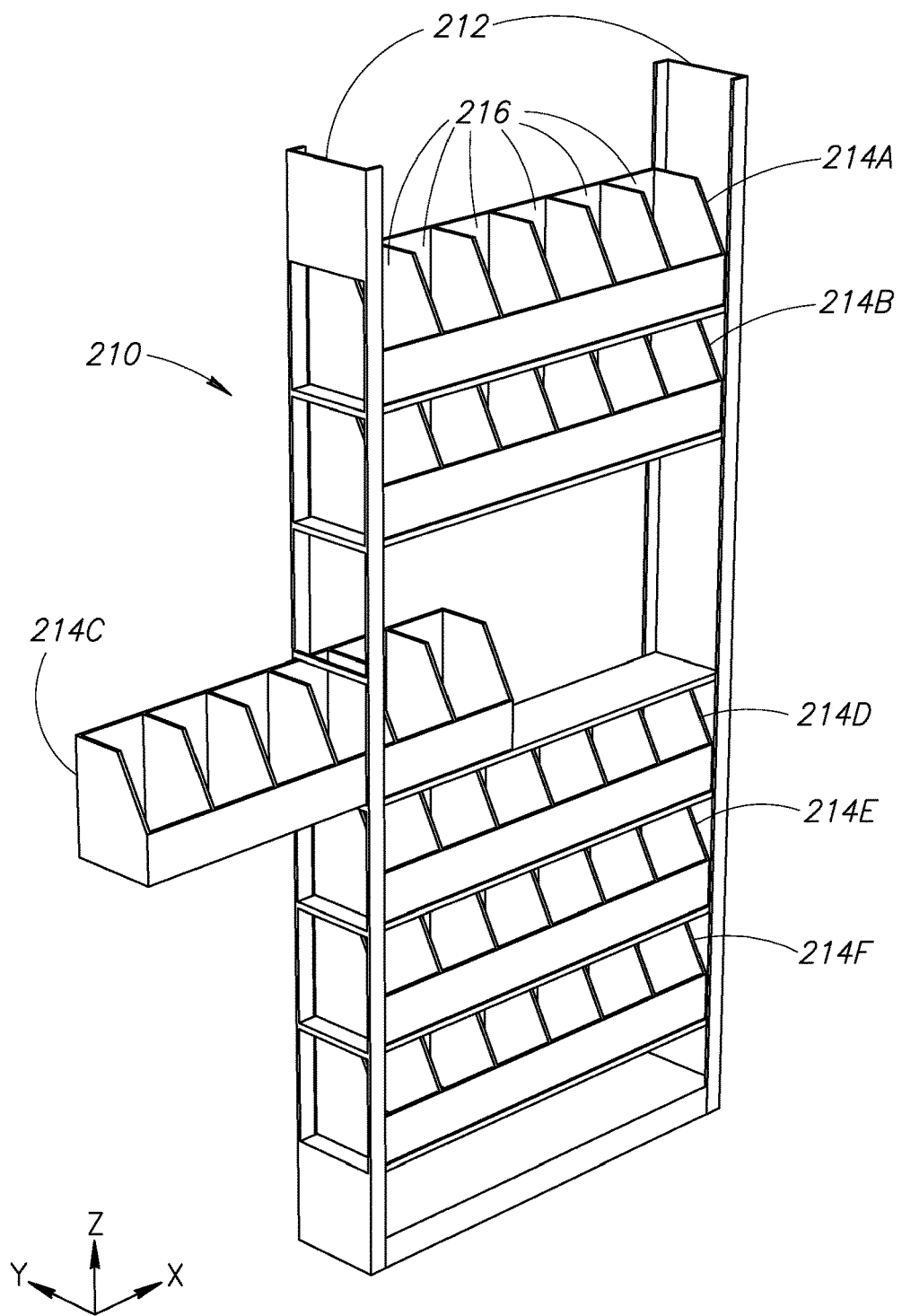
FIG. 3 illustrates a storage shelf, including a frame and a plurality of bin modules that are removably supported in the frame, according to some embodiments.

Referring additionally to FIG. 3, each of the plurality of storage shelves 210 includes a frame 212 and a plurality of bin modules (214A-214F in the illustrated embodiment) that are removably supported in the frame 212. In the illustrated embodiment, as shown with the bin module 214C, the bin modules 214A-214F are removably supported such that they are movable (e.g., slidable) along their longitudinal direction (X direction in FIG. 3) to be retracted from, and inserted into, the frame 212. In other embodiments, depending on how the storage shelves 210 are arranged in a particular inventory workspace, the bin modules 214A-214F may be movable along their lateral direction (Y direction in FIG. 3) to be retracted from, and inserted into, the frame 212 along the lateral direction.

The bin module 214 includes a plurality of bins 216 for storing inventory items. Though the bins 216 all have an equal size in the illustrated embodiment, the bins 216 may have different sizes or shapes depending on each application. According to various embodiments, the plurality of bins 216 included in a bin module 214 are provided to store different types of inventory items, respectively, such that each bin module 214 stores multiple types of inventory items. In operation, to fulfill a customer order, the dolly 300 moves between the plurality of storage shelves 210 to retrieve the bin modules 214, which include bins 216 containing purchased items associated with the order. Note that, in various exemplary embodiments of the present invention, bin modules 214 are retrieved even though in most cases only one bin 216 of the retrieved bin module 214 contains purchased items of interest while other bins 216 do not contain purchased items of interest. However, any inefficiency associated with retrieving bin modules 214 containing items unrelated to an order is outweighed by efficiency associated with speed and ease of management realized by collecting items of interest on a bin module basis as opposed to on an individual bin basis.

Figure 4:
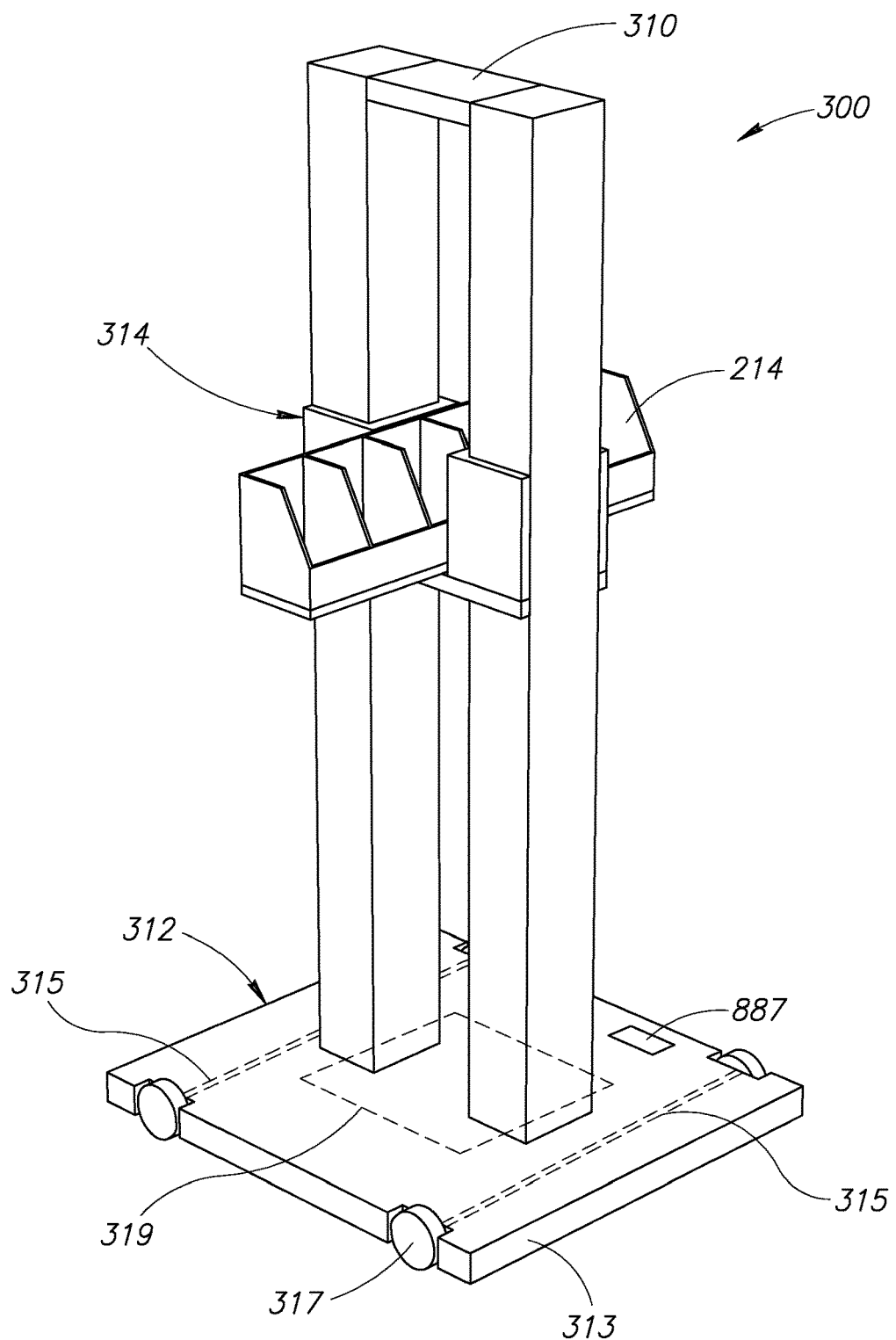
FIG. 4 illustrates a dolly according to an embodiment, including a dolly frame, a drive module configured to propel the dolly, and an actuator to move a coupler (e.g., an arm) to couple to a bin module when the dolly is positioned adjacent to the storage shelf that removably supports the bin module.

FIG. 4 illustrates a dolly 300 according to an embodiment, which includes a dolly frame 310, a drive module 312 configured to propel the dolly 300, an actuator 314 configured to move a coupler 330 (see FIG. 5C) to couple to a bin module 214 when the dolly 300 is positioned adjacent to a storage shelf 210 that removably supports the bin module 214, and a control unit 319 that controls operation of the drive module 312 and the actuator 314. FIG. 4 illustrates the dolly 300 that has already received a bin module 214; it should be noted that the bin module 214 does not form an integral part of the dolly 300.

In the illustrated embodiment (see additionally FIG. 2), the dolly 300 is capable of moving bi-directionally along an aisle 320 between two adjacent rows 322 of storage shelves 210, though in other embodiments the dolly 300 may be configured to move in any direction over a given workspace. FIG. 2 shows two dollies 300A and 300B, each configured and arranged to move between two adjacent rows 322 of the storage shelves 210.

In the embodiment shown in FIG. 4, the drive module 312 of the dolly 300 includes a base plate 313, axles 315, wheels 317 attached to both ends of each axle 315, and one or more motors (not shown). The control unit 319 of the dolly 300 includes a processor (e.g., a microprocessor), which controls the one or more motors to drive the axles 315 and/or wheels 317. The drive module 312 may be self-powered, or may receive power externally via, for example, a powered cable, track, or rail arranged in the inventory workspace. The control unit 319 of the dolly 300 may further include a receiver (e.g., a wireless receiver) configured to receive commands from the control system 102 (see FIG. 1), and a transmitter (e.g., a wireless transmitter) configured to transmit signals to the control system 102 to report the dolly 300's status, location, or any other information that the control system 102 may use for the purpose of controlling the dolly(ies) 300.

The motorized axles 315 and/or wheels 317 are operable to rotate in a first direction to propel the dolly 300 in a forward direction, and are operable to rotate in a second direction to propel the dolly 300 in a backward direction. The drive module 312 may further be configured to rotate the motorized axles 315 and/or wheels 317 in different directions or at different speeds from one another, so as to cause the dolly 300 to rotate (or spin) in some embodiments.

In some embodiments, in response to receiving a command from the control system 102 via the receiver in the control unit 319, the processor of the control unit 319 controls the one or more motors to drive the axles 315 and/or wheels 317 to move the dolly 300 according to the command. The receiver may receive the commands through a wireless interface, or over a wired connection arranged over the inventory workspace, using any suitable communications protocol or components to communicate with the control system 102.

In other embodiments, the processor of the control unit 319 may control movement of the dolly 300 in whole or in part in cooperation with commands received from the control system 102. Further alternatively or additionally, when multiple dollies 300 are provided, the control unit 319 of each dolly 300 may communicate with the control units 319 of other dollies 300, to coordinate their movement with each other. In these cases, movement of the drive module 312 may be controlled in part by the control unit 319 and in part by the commands received from the control system 102 or information received from the control units 319 of other dollies 300. For example, commands received from the control system 102 may direct the drive module 312 to move from one location to another location, or identify which bin module to retrieve from which storage shelf, or which collection shelf (or workstation shelf) 210A (see FIG. 2) to bring the retrieved bin module to, etc while the control unit 319 of the dolly 300 may self-determine its location for use in controlling movement of the dolly 300.

For the control unit 319 to determine its position in the inventory workspace, in particular relative to each of the storage shelves 210, an identification tag (e.g., an RFID tag, one-dimensional or two-dimensional barcode, etc.) may be attached to each of the storage shelves 210. The control unit 319 may include an appropriate identification tag sensor 887 (e.g., an RFID tag sensor and a barcode sensor) capable of reading the identification tags. The processor in the control unit 319 processes the sensed tag information to determine the location of the dolly 300 relative to known locations of the storage shelves 210 in the inventory workspace.

As shown in FIGS. 4 and 5A-6E, the dolly 300 includes the actuator 314 configured to move the coupler 330 (e.g., an arm) to couple to a corresponding coupler 218 of a bin module 214, which is removably supported in a storage shelf 210, when the dolly 300 is positioned adjacent to the storage shelf 210. Once a physical connection between the coupler 330 and the bin module 214 (via the corresponding coupler 218) is established, the actuator 314 moves the coupler 330 to remove the bin module 214 from the storage shelf 210 onto the dolly frame 310 (see FIG. 4). The coupler 330 may couple to the bin module 214 (via the corresponding coupler 218) in any appropriate manner so that the bin module 214 can be moved between any of the storage shelves 210 and the dolly 300. Also, the actuator 314 may be configured to adjust a vertical position of the coupler 330 relative to a shelf 210 such that the coupler 330 may couple to a bin module 214 located at any vertical position within the shelf 210, in a case where multiple bin modules 214 are vertically stacked in each shelf 210 as shown in FIG. 2.

The actuator 314 is configured to move the coupler 330 to retrieve the bin module 214 from a storage shelf 210 onto the dolly frame 310, and is further configured to move the coupler 330 in reverse to move the bin module 214 from the dolly frame 310 to a shelf 210. The shelf 210, to which the bin module 214 is moved to, may be a collection shelf 210A (FIG. 2) located among the plurality of storage shelves 210 to collect the retrieved bin modules 214. Note that the collection shelf 210A may have the same structure as any other storage shelves 210, and one or more of the storage shelves 210 may be designated as the collection shelves to collect the retrieved bin modules 214.

The coupler 330 couples to the bin module 214 so as to move the bin module 214 between any shelf 210 and the dolly frame 310. To that end, the coupler 330 may grasp, connect to, interlock with, or otherwise interact with a corresponding coupler 218 of the bin module 214 to form a physical connection between the coupler 330 and the bin module 214. It should be noted that the corresponding coupler 218 of the bin module 214 may be a portion (or a whole) of the bin module 214 itself, and need not be provided as a separate element. For example, in some embodiments, the coupler 330 may interact with a surface or an edge of the bin module 214 itself to form a physical connection therewith, in which case the surface or edge of the bin module 214 itself forms the corresponding coupler 218. In other embodiments, the coupler 330 may interact with a corresponding coupler (e.g., a mechanical lock) that is attached to the bin module 214, in which case the corresponding coupler 218 does not form an integral part of the bin module 214.

FIGS. 5A-5E illustrate an operation of an actuator 314A according to one embodiment, which includes the coupler 330 comprising one or more arms configured to extend to, and retract from, a storage shelf 210 when the dolly 300 is positioned adjacent to the storage shelf 210.

Figures 5A, 5B:
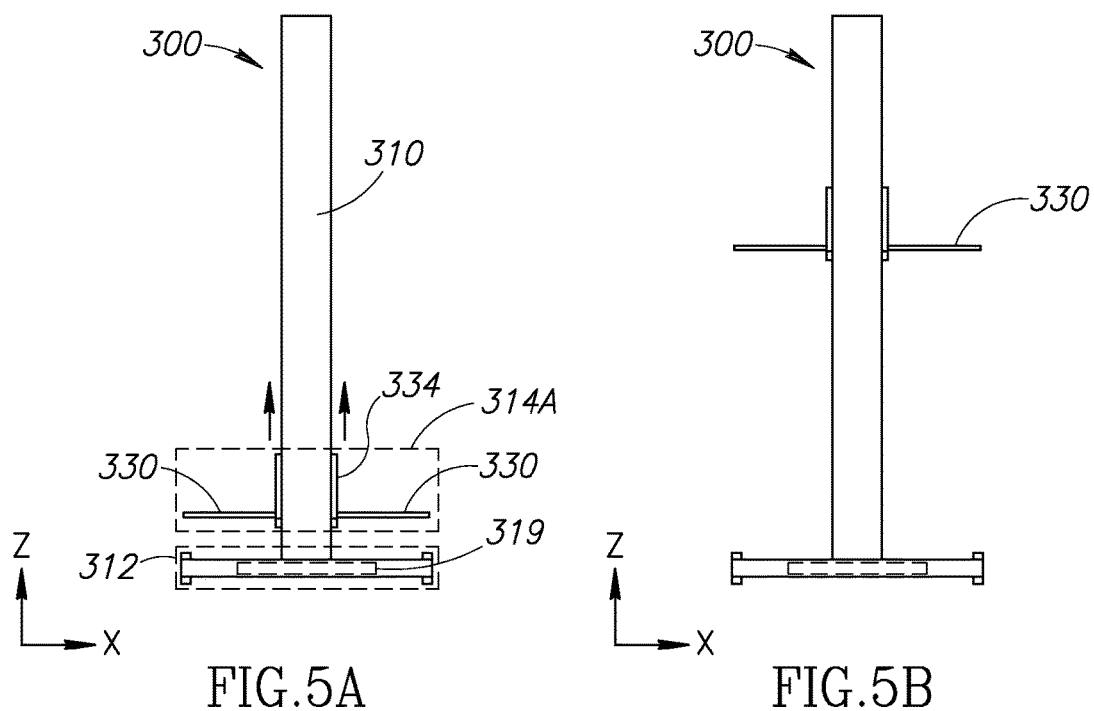
FIGS. 5A-5E illustrate a sample operation of a dolly according to one embodiment, which retrieves a removable bin module from a storage shelf and moves it to a dolly frame.

In FIG. 5A, the actuator 314A comprises a suitable linear actuator (e.g., a combination of one or more motors, gears, cam assemblies, etc.) configured to move the one or more arms (the "coupler") 330 along X direction. For example, the one or more arms 330 may be telescoping arms. In the illustrated embodiment, the one or more arms 330 are extendible on both sides of the dolly frame 310 so as to retrieve bin modules 214 from the storage shelves 210 located on either side of the dolly 300. In other embodiments, the one or more arms 330 may be extendible on only one side of the dolly frame 310. In various embodiments, the actuator 314A further comprises another linear actuator 334 (e.g., a combination of one or more motors, gears, cam assemblies, etc.) configured to move the coupler 330 along Z direction, to change the vertical position of the coupler 330 relative to the dolly frame 310. The control unit 319 controls movement of both of the linear actuators to move the coupler 330 in X direction and Z direction, respectively. The processor in the control unit 319 is configured to control the actuator 314A in whole or in part, based on commands received from the control system 102 in some embodiments while not using commands from the control system 102 in other embodiments.

FIG. 5A illustrates the actuator 314A moving the coupler 330 upwardly relative to the dolly frame 310, until the coupler 330 reaches a vertical position that is generally adjacent to the bin module 214 to be retrieved from a storage shelf 210, as shown in FIG. 5B.

Figure 5C:
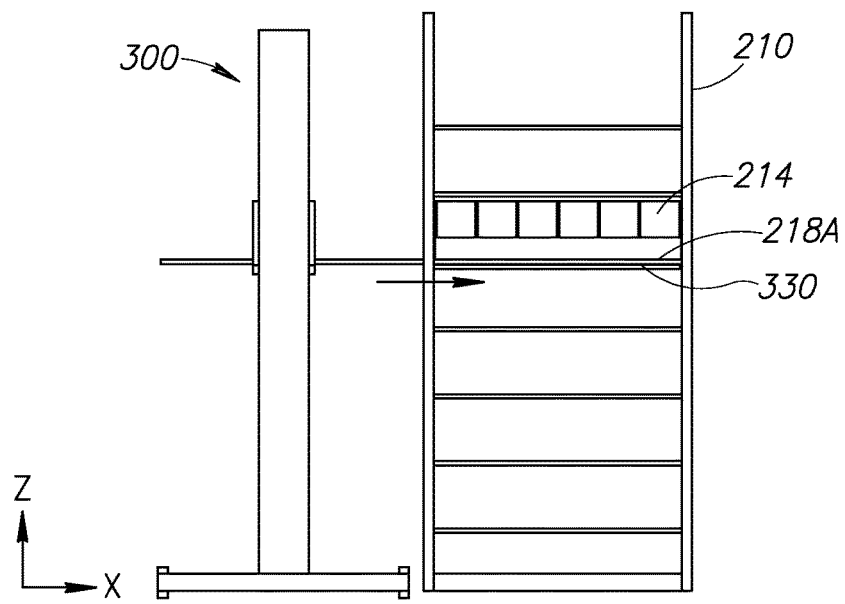

In FIG. 5C, the control unit 319 activates the actuator 314A to move the coupler (comprising one or more arms) 330 such that the one or more arms 330 extend toward the storage shelf 210. In the illustrated embodiment, the one or more arms 330 are inserted beneath the bin module 214 to partially or completely support the bin module 214 from underneath. To this end, a distal end of the one or more arms 330 may include a suitable mechanism or configuration to slightly lift the bin module 214, so as to ease insertion of the rest of the arms 330 under the bin module 214. It should be noted that, though the arms 330 are shown to have a thickness in the Z direction for the purpose of clear illustration, the arms 330 may be formed to have a minimum thickness to facilitate easy insertion under the bin module 214. Thus, it should be further noted that the physical dimensions of various components as shown in this and other drawings are for illustrative purposes only, and various embodiments of the present invention are not limited to the particular embodiments having those physical dimensions as illustrated in these drawings.

In the illustrated example, the corresponding coupler 218A of the bin module 214 may be provided by a bottom surface of the bin module 214 itself. In other embodiments, however, a separate component may be provided on the bottom surface of the bin module 214 to couple to the one or more arms 330 via suitable mechanical, electronic, electromagnetic, or magnetic means. For example, mechanical guides, tracks, slots, etc., may be provided on the bottom surface of the bin module 214 to receive and interact with the one or more arms 330 of the dolly 300. As other examples, electromagnetic or magnetic couplers may be provided both on the bottom surface of the bin module 214 and on the one or more arms 330, to ensure that a physical connection between the bin module 214 and the arms 330 is maintained in particular when the arms 330 are being retracted while holding the bin module 214 thereon.

Figure 5D:
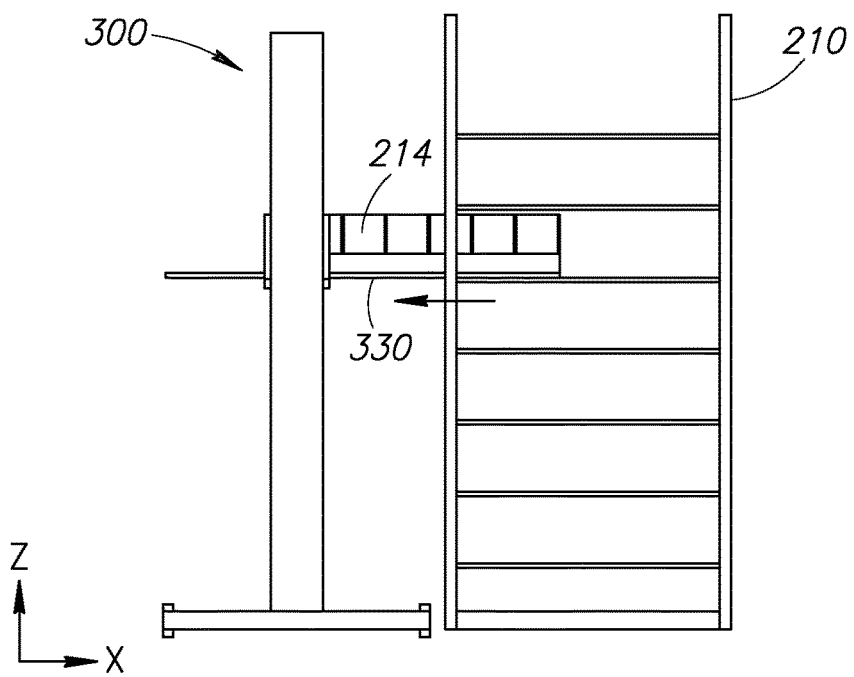
Figure 5E:
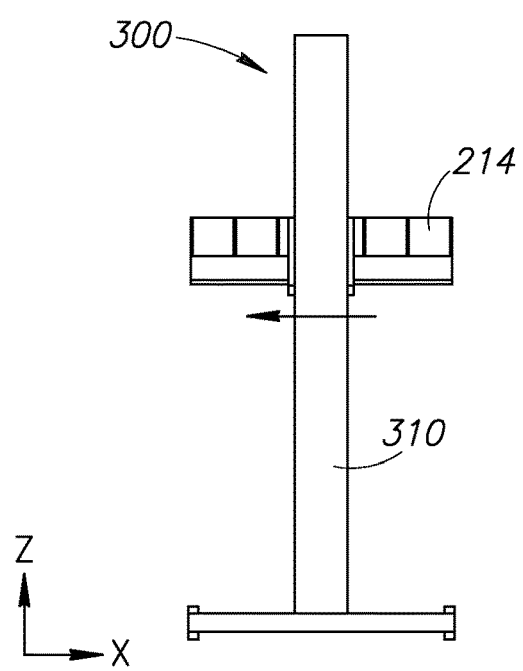

In FIG. 5D, the control unit 319 activates the actuator 314A to retract the coupler (comprising one or more arms) 330, on which the retrieved bin module 214 is supported. The one or more arms 330 continue to be retracted with the bin module 214 being moved toward the dolly frame 310 until, as shown in FIG. 5E, the retrieved bin module 214 is fully received in the dolly frame 310. (See also FIG. 4.)

In reverse, FIGS. 5E-5B illustrate an operation of the first embodiment of the actuator 314A, which moves the bin module 214 from the dolly 300 to a shelf 210, such as to a collection shelf 210A provided to collect the retrieved bin modules 214.

Specifically, in FIG. 5E, the dolly 300 holding the bin module 214 is moved to be located adjacent to the collection shelf 210A. In FIG. 5D, the control unit 319 activates the actuator 314A to move the coupler (comprising one or more arms) 330 toward the collection shelf 210A while supporting the bin module 214 thereon. (The direction of an arrow in FIG. 5D indicating the moving direction of the coupler 330 is switched.)

In FIG. 5C, the coupler 330 continues to be extended while supporting the bin module 214 thereon until the bin module 214 is fully received in the collection shelf 210A. Thereafter, the control unit 319 activates the actuator 314A to retract the coupler 330 to its original position, while leaving the bin module 214 in the collection shelf 210A, as shown in FIG. 5B. In this connection, suitable mechanical, electronic, electromagnetic, or magnetic components may be provided to facilitate uncoupling (separation) of the coupler 330 from the bin module 214. For example, if electromagnetic components are provided as part of the coupler 330 and the corresponding coupler 218 of the bin modules 214 to establish a secure physical connection between the coupler 330 and the bin module 214, then after the bin module 214 is fully received in the collection shelf 210A the polarity of the electromagnetic components may be changed to facilitate uncoupling of the coupler 330 from the bin module 214. In other embodiments, on the other hand, the weight of the bin module 214 may provide sufficient inertia to keep the bin module 214 in the collection shelf 210A while the one or more arms 330 are being retracted from underneath.

It should be understood that the above-described operation to retrieve or place a bin module 214 from, or in, a shelf 210 may be performed on either or both sides of the dolly 300. Specifically, as shown in FIG. 2, when the dolly 300 is used between two adjacent rows 322 of the storage shelves 210, in various exemplary embodiments, the dolly 300 is configured to perform the operation described above in reference to FIGS. 5A-5E (and 5E to 5B) on either side of the dolly 300.

While in the above-described embodiment, the one or more arms 330 are extended to be inserted underneath the bin module 214 to support it from underneath, interaction between the one or more arms 330 and the bin module 214 is not limited to this particular configuration. For example, it may be equally suitable to have two (or two sets of) arms 330 hold (sandwich) the bin module 214 therebetween. In this embodiment, the two (or two sets of) arms 330 are configured and controlled to "close" together to hold the bin module 214, and to "open" to release the bin module 214.

FIGS. 6A-6E illustrate an operation of another embodiment of the actuator 314B, which may be used in accordance with the present invention. As with the previous embodiment, the actuator 314B also comprises one or more arms 330 though, unlike the previous embodiment, the one or more arms 330 may be horizontally stationary. Instead, as shown in FIG. 6F, the actuator 314B may be configured to move a coupler 335, which is in the form of a T-shape hook and which is configured to slide along a longitudinal slot 337 provided in the arm 330. The actuator 314B includes a linear actuator that selectively moves the coupler 335 along X direction. As in the previous embodiment, the actuator 314B also includes another (vertical) linear actuator 334 to selectively move the coupler 335 and the arm 330 along Z direction. The control unit 319 controls movement of both of the linear actuators to move the coupler 335 in X direction and Z direction, respectively.

Figure 6A:
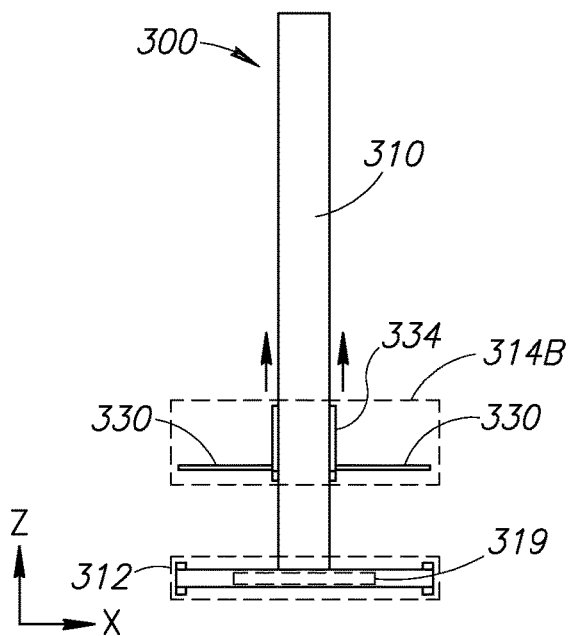

FIG. 6A illustrates the actuator 314B moving the coupler 335 (hidden behind the dolly frame 310 and not shown) upwardly relative to the dolly frame 310, until the coupler 335 reaches a vertical position that is generally adjacent to the bin module 214 to be retrieved from a storage shelf 210.

Figure 6B:
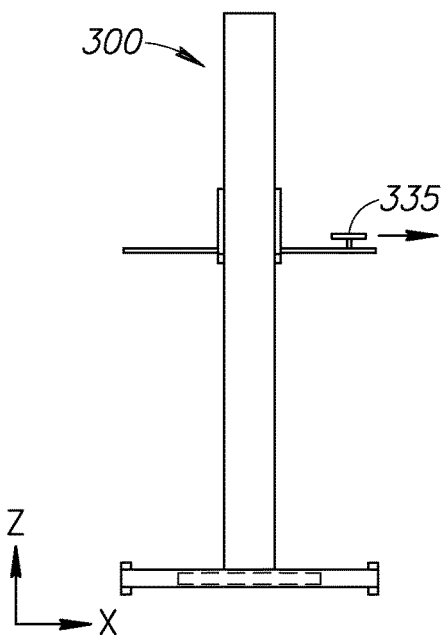

In FIG. 6B, the actuator 314B moves the coupler 335 toward the bin module 214 to be retrieved.

Figure 6C:
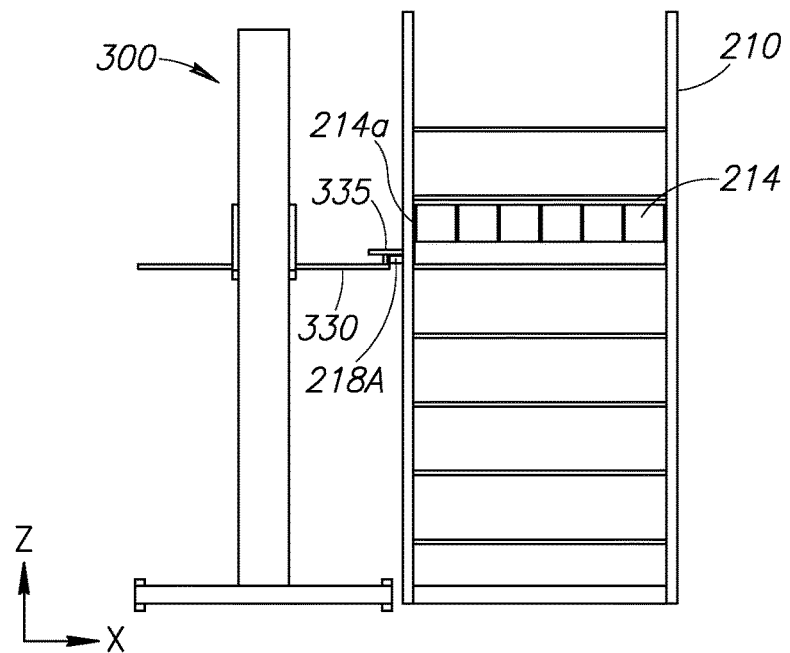

In FIG. 6C, the coupler 335 couples to a corresponding coupler 218B provided on the bin module 214. As before, a physical connection between the coupler 335 and the corresponding coupler 218B of the bin module 214 may be established by various means, such as by using mechanical components (e.g., hook or latch), electronic components, electromagnetic components, magnetic components, etc. In the illustrated embodiment, the corresponding coupler 218B is formed as a component configured to receive or engage with the T-shape coupler 335. In some embodiments, the corresponding coupler 218B may simply be an end surface 214a of the bin module 214 itself, to which the coupler 335 attaches via mechanical, electronic, electromagnetic, or magnetic means. For example, the coupler 335 may consist of a hook or latch component, which hooks or latches onto an edge of the end surface 214a of a bin module 214 to be retrieved. Thus, as before, it should be understood that the corresponding coupler 218B of the bin module 214 may be integrally or separately formed with the bin module 214 and, in particular, the corresponding coupler 218B may be an integral portion of the bin module 214 itself.

In FIG. 6D, the actuator 314B activates the coupler 335 in a reverse direction to thereby pull the bin module 214 coupled via the corresponding coupler 218B. In FIG. 6E, the retrieved bin module 214 is fully received in the dolly frame 310.

FIGS. 6E to 6B illustrate a reverse operation of moving the bin module 214 from the dolly frame 310 to a storage shelf, such as the collection shelf 210A (see FIG. 2). In FIG. 6E, the coupler 335, which is placed near an end of the arm 330 farthest away from the collection shelf 210A, is moved by the actuator 314B toward the collection shelf 210A.

FIG. 6D shows that the coupler 335 further pushes the bin module 214 into the collection shelf 210A, which has partially received the bin module 214. (The direction of an arrow in FIG. 6D indicating the moving direction of the coupler 335 is switched.) In FIG. 6C, the bin module 214 is fully received inside the collection shelf 210A. At this point, the coupler 335 uncouples from the corresponding coupler 218B of the bin module 214 and, as shown in FIG. 6B, the actuator 314B pulls the coupler 335 back toward the dolly frame 310. As before, suitable mechanical, electronic, electromagnetic, or magnetic components may be provided to facilitate uncoupling (separation) of the coupler 335 from the bin module 214. It should be noted that, while the coupler 335 uncouples from the bin module 214 (or the corresponding coupler 218B of the bin module 214), the coupler 335 need not be fully retracted toward the dolly frame 310. Instead, the coupler 335 may remain near an end of the arm 330 closer to a shelf 210 so that it is separated by a minimum distance from the next bin module 214 to be retrieved.

As in the previously described embodiment, the operation of the actuator 314B to retrieve or place a bin module 214 from, or in, a storage shelf 210 may be performed on either or both sides of the dolly 300.

Referring back to FIG. 2, in some embodiments, the collection shelf 210A may additionally serve as a workstation shelf, from which the purchased items contained in the collected bin modules 214 are manually, semi-automatically, or automatically removed for further processing, such as for packing to be shipped to the purchasing customers. In other embodiments, as shown in FIG. 2, the bin modules 214 collected at the collection shelf 210A are thereafter moved down to a lower level via an elevator 400, and then placed in an independent workstation shelf 220 located adjacent to the elevator 400 on the lower level. Then, the retrieved bin modules 214 are further processed at the workstation shelf 220 on the lower level. This arrangement including the elevator 400 is advantageous when the inventory workspace is limited and/or to make maximum use of a vertical workspace provided by a high ceiling, for example.

Figure 7:
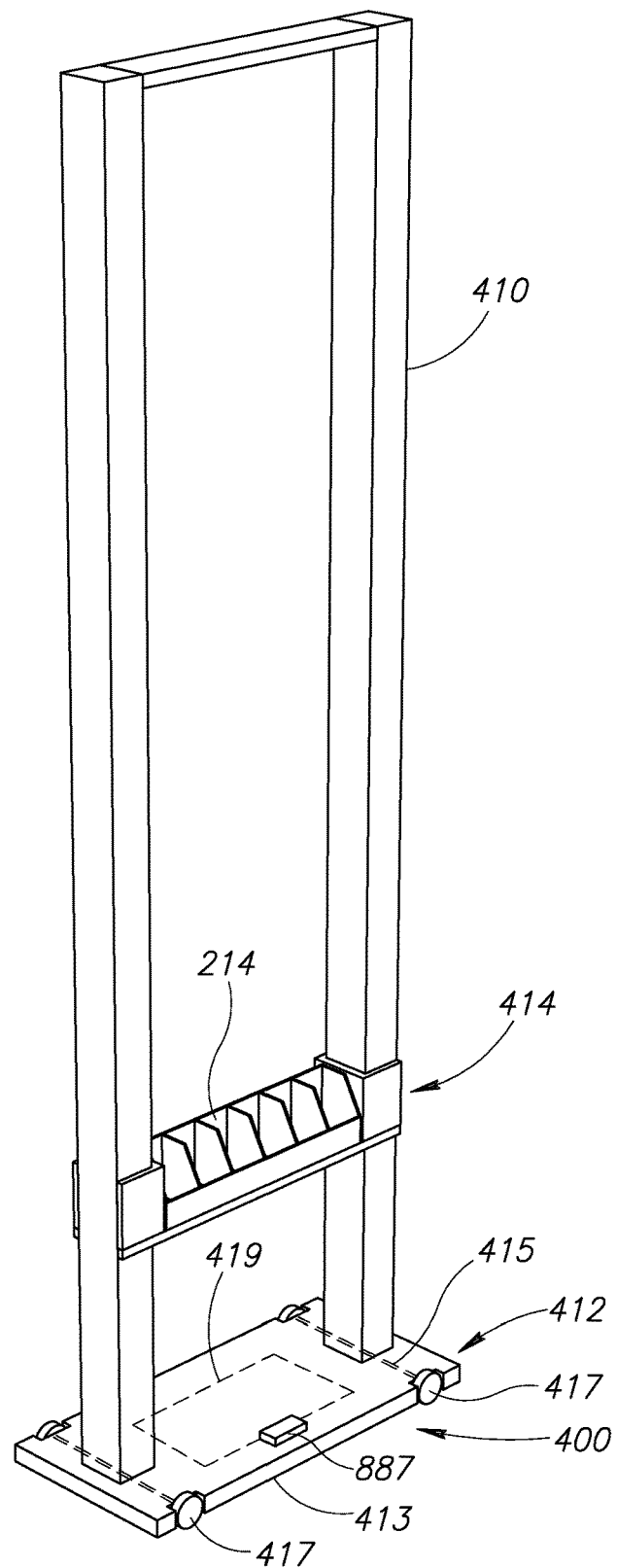
FIG. 7 illustrates an elevator configured to move bin modules retrieved from shelves between two (floor) levels, according to some embodiments.

FIG. 7 illustrates an elevator 400 according to an embodiment, which is configured to move bin modules 214 retrieved from the storage shelves 210 between an upper level (e.g., mezzanine level) and a lower level within the inventory workspace. In various exemplary embodiments, the elevator 400 includes an elevator frame 410, a drive module 412 configured to propel the elevator 400, an actuator 414 configured to move a coupler 330' for holding a bin module 214 (see FIGS. 8B and 8E) both vertically and horizontally, and a control unit 419 that controls operation of the drive module 412 and the actuator 414.

The drive module 412, similar to the drive module 312 of the dolly 300, may comprise a base plate 413, axles 415, wheels 417 attached to both ends of each axle 415, and one or more motors (not shown). The control unit 419, similar to the control unit 319 of the dolly 300, includes a processor (e.g., a microprocessor), which controls the one or more motors to drive the axles 415 and/or wheels 417 to thereby control movement of the drive module 412. As before, the drive module 412 may be self-powered or may receive power externally via, for example, a powered cable, track, or rail arranged on the lower level of the inventory workspace. Similar to the control unit 319 of the dolly 300, the control unit 419 of the elevator 400 may further include a receiver (e.g., a wireless receiver) configured to receive commands from the control system 102 (see FIG. 1), and a transmitter (e.g., a wireless transmitter) configured to transmit signals to the control system 102 to report the elevator 400's status, location, or any other information that the control system 102 may use for the purpose of controlling the elevator 400.

The control unit 419 may be configured to control operation of the drive module 412 and the actuator 414 on its own, or may control operation of the drive module 412 and the actuator 414 in whole or in part based on control commands received from the control system 102. Further alternatively or additionally, when multiple elevators 400 are provided, the control unit 419 of each elevator 400 may communicate with the control units 419 of other elevators 400 as well as with the control units 319 of the dollies 300, to coordinate their respective movement with each other.

As shown in FIGS. 7 and 8A-8D, the elevator 400 includes the actuator 414 configured to move the coupler 330' (in the form of one or more arms) both vertically in Z direction and horizontally in Y direction. As with the coupler 330 of the dolly 300, the coupler 330' of the elevator 400 is configured to couple to, and uncouple from, a corresponding coupler of the bin module 214 wherein, as before, the corresponding coupler may be part of the bin module 214 itself or may be provided as a separate component attached to the bin module 214. The actuator 414 of the elevator 400 is configured to move the coupler 330' to couple to a corresponding coupler of a bin module 214, which is removably supported in a shelf (e.g., a collection shelf 210A). Once a physical connection between the coupler 330' and the bin module 214 (via the corresponding coupler) is established, the actuator 414 moves the coupler 330' to remove the bin module 214 from the collection shelf 210A onto the elevator frame 410. The coupler 330' may couple to the bin module 214 (via the corresponding coupler) in any appropriate manner so that the bin module 214 can be moved between any shelf (e.g., collection shelf 210A or workstation shelf 220) and the elevator 400. To that end, the coupler 330' may grasp, connect to, interlock with, or otherwise interact with a corresponding coupler of the bin module 214. For example, the coupler 330' of the elevator 400 may take the form of any of the embodiments of the coupler described above in connection with the dolly 300 in reference to FIGS. 5A-6F.

In the illustrated example, the actuator 414 is configured to move the coupler 330' in X direction to retrieve the bin module 214 from a collection shelf 210A, provided on the upper level, onto the elevator frame 410. The actuator 414 is further configured to move the coupler 330' vertically (i.e., downwardly along Z direction) while holding the bin module 214, to thereby lower the bin module 214 from the upper level to the lower level. The actuator 414 is still further configured to move the coupler 330', in opposite X direction, to thereby move the bin module 214 from the elevator frame 410 to a workstation shelf 220 provided on the lower level.

FIGS. 8A-8D illustrate an operation of one example of the actuator 414, which includes the coupler 330' comprising one or more arms, such as telescoping arms, configured to extend to, and retract from, a workstation shelf 220. Note that the workstation shelf 220 may have the same structure as any of the storage shelves 210 described above.

Figure 8A:
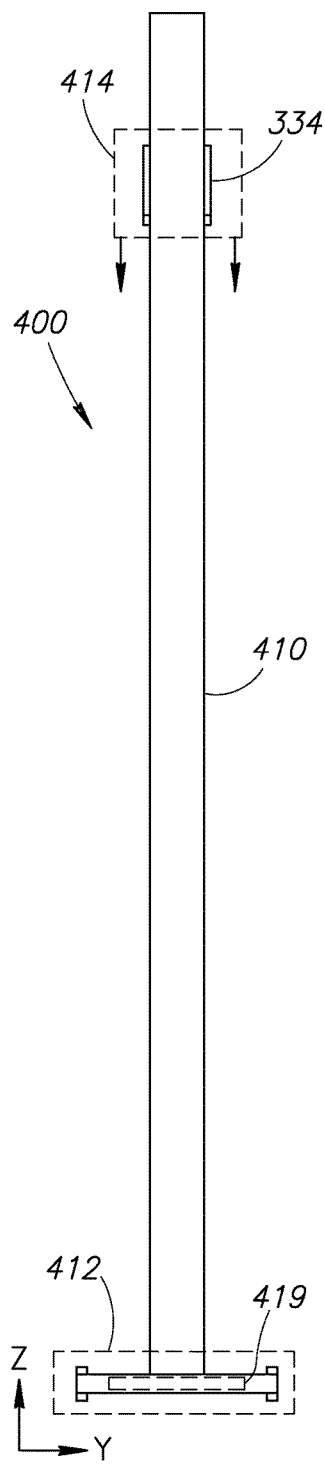
FIGS. 8A-8D illustrate a sample operation of an elevator according to one embodiment, which vertically (downwardly) moves a bin module to place it in a shelf on a lower level.

In FIG. 8A, the actuator 414 comprises a suitable linear actuator (e.g., a combination of one or more motors, gears, cam assemblies, etc.) configured to move the one or more arms (the "coupler") 330' along Y direction. The actuator 414 further comprises another (vertical) linear actuator 334 configured to move the coupler 330' along Z direction, to change the vertical position of the coupler 330' relative to the elevator frame 410. The control unit 419 controls movement of both of the linear actuators to move the coupler 330' in Y direction and Z direction, respectively. The processor in the control unit 419 may be configured to control the actuator 414 in whole or in part based on commands received from the control system 102.

FIG. 8A illustrates the elevator 400, which has already received a bin module 214 (hidden behind the elevator frame 410 and not shown) from the collection shelf 210A on the upper level. The actuator 414 moves the coupler 330' downwardly relative to the elevator frame 410, until the coupler 330' is positioned generally adjacent to the workstation shelf 220 positioned on the lower level or, more specifically, adjacent to an empty shelf position within the workstation shelf 220 for receiving the bin module 214.

Figure 8B:
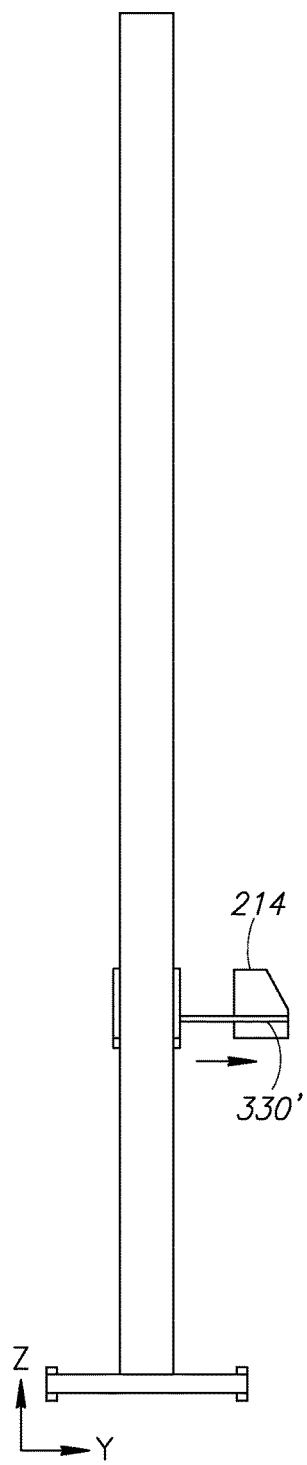

In FIG. 8B, the control unit 419 activates the actuator 414 to move the coupler (comprising two or two sets of arms) 330' such that the coupler 330' is extended toward the workstation shelf 220 while holding the bin module 214. In the illustrated embodiment, as best shown in FIG. 8E which is a top plan view, the two or two sets of arms 330' are holding (sandwiching) the bin module 214 therebetween while the arms 330' are extended toward the workstation shelf 220. In other embodiments, the coupler 330' may comprise one or more arms that extend while supporting the bin module thereon from underneath, or may comprise one or more arms that hook or latch onto a side surface 214b or an edge of the side surface 214b of the bin module 214 (see FIG. 8E).

Figure 8C:
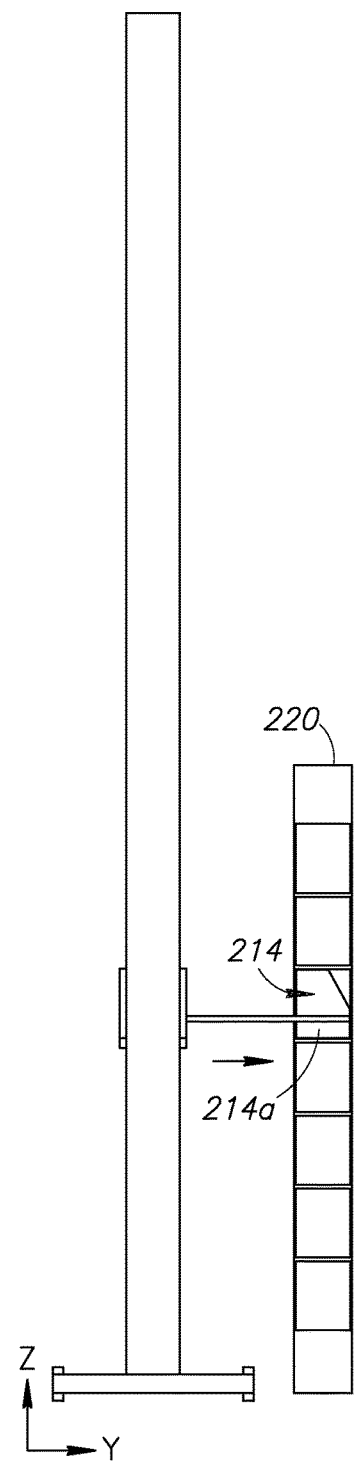
Figures 8D, 8E:
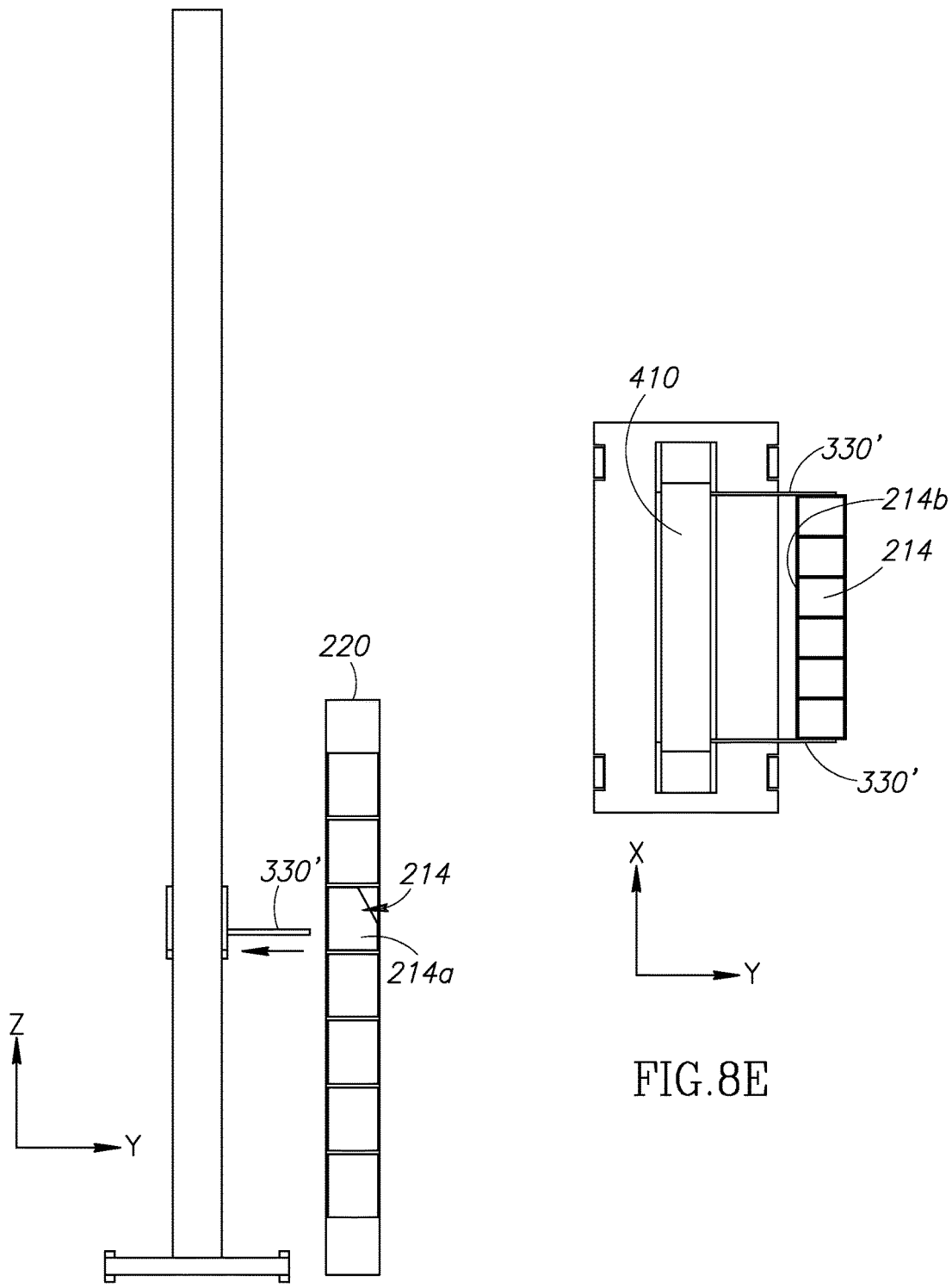
FIG. 8E is a top plan view of an elevator, with two arms extending therefrom while holding a bin module therebetween.

In FIG. 8C, the two or two sets of arms 330' are fully extended, and at this point the bin module 214 is received in the workstation shelf 220. Then, the coupler (comprising two or two sets of arms) 330' uncouple from the bin module 214 and, as shown in FIG. 8D, the actuator 414 retracts the coupler 330' toward the elevator frame 410, while leaving the bin module 214 in place in the workstation shelf 220.

FIGS. 8D-8A illustrate a reverse operation of the actuator 414 to retrieve the bin module 214 from the workstation shelf 220 onto the elevator frame 410. For example, the coupler 330' may retrieve a used bin module 214, from which purchased items of interest have been removed for packaging purposes, from the workstation shelf 220 on the lower level. Then, the used bin module may be returned to any of the storage shelves 210 on the upper level. Alternatively, FIGS. 8D-8B may be viewed as illustrating an operation of retrieving a bin module 214 containing items of interest from the collection shelf 210A on the upper level to the dolly frame 410.

In FIG. 8D, the control unit 419 activates the actuator 414 to move the coupler (e.g., two or two sets of arms) 330' toward the workstation shelf 220 containing a "used" bin module 214 to be retrieved.

In FIG. 8C, the two or two sets of arms 330' are fully extended in Y direction, and thereafter are "closed" in X direction (i.e., in a direction into the plane of FIG. 8C) to thereby hold (sandwich) the used bin module 214 therebetween.

In FIG. 8B, the two or two sets of arms 330' are retracted toward the elevator frame 410 while holding the used bin module 214 until the used bin module 214 is fully received in the elevator frame 410. In FIG. 8A, the actuator 414 moves the coupler 330' holding the used bin module 214 upwardly, until the coupler 330' is positioned adjacent to the collection shelf 210 on the upper level. Thereafter, an operation as shown in FIG. 8B-8D is repeated to place the used bin module 214 in an empty shelf space of the collection shelf 210 on the upper level. From the collection shelf 210, the dolly 300 retrieves the used bin module 214 and moves it back to any of the storage shelves 210 on the upper level.

While FIGS. 8A-8E illustrate an example of the actuator 414 including the coupler 330' in the form of one or more extendable/retractable arms, different embodiments of the coupler 330' configured to retrieve or place a bin module from, or in, an adjacent shelf are equally applicable, such as the embodiment including horizontally stationary arm 330 as described in reference to FIGS. 6A-6F above.

Figure 9:
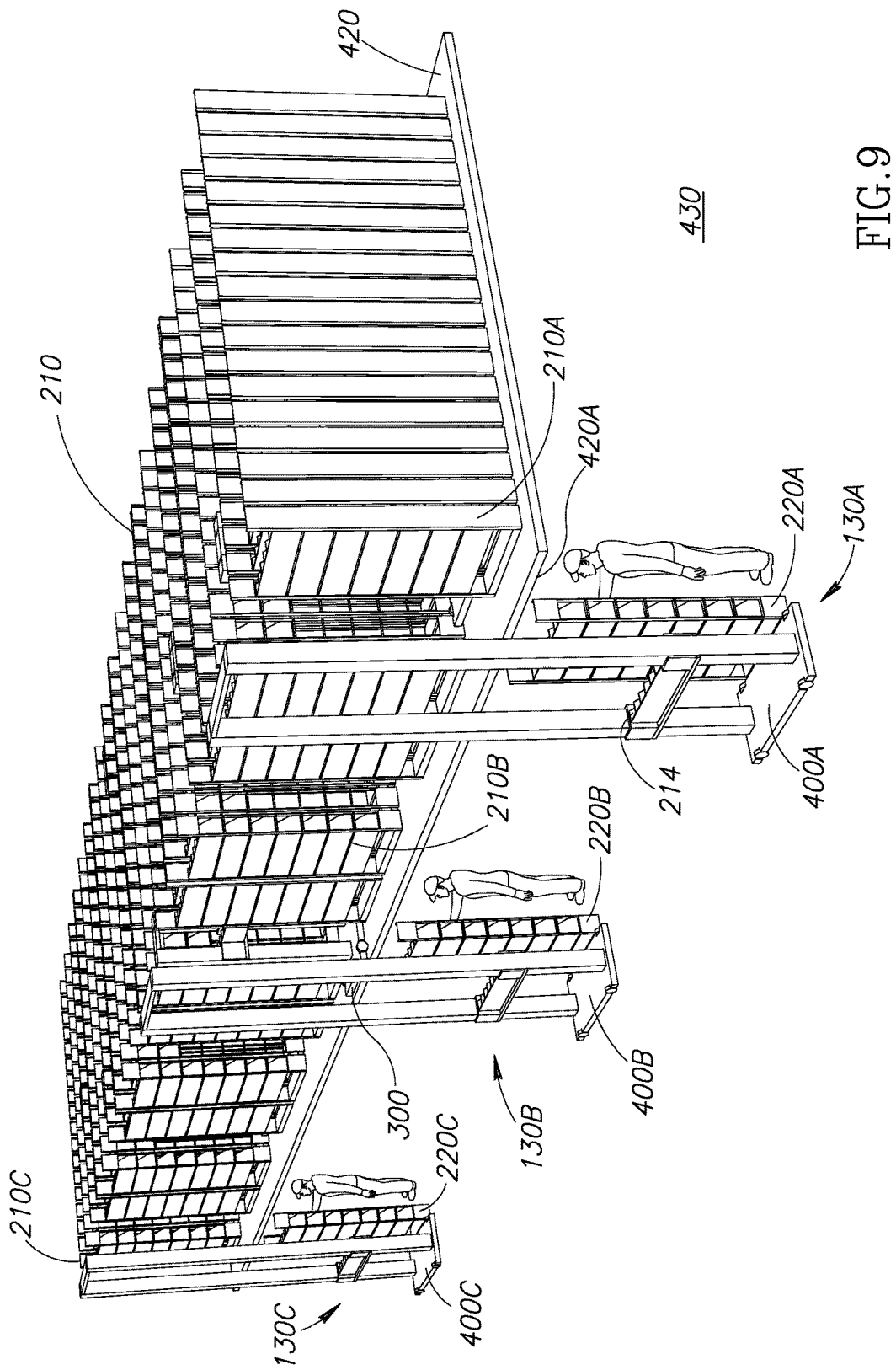
FIG. 9 is a perspective view of a system for transporting inventory according to an embodiment of the present invention, including a plurality of storage shelves, a plurality of dollies that move between the shelves, and a plurality of elevators that move bin modules between two levels.

FIG. 9 is a perspective view of a system for transporting inventory according to an embodiment of the present invention, including a plurality of storage shelves 210 and a plurality of dollies 300 placed on an upper level 420. Each of the dollies 300 is placed to move along an aisle between two adjacent rows of the storage shelves 210. FIG. 9 also describes that, on a lower level 430, a plurality of elevators 400A-400C, a plurality of workstation shelves 220A-220C, and a plurality of workstations 130A-130B are provided. The workstations 130A-130B are provided adjacent to the workstation shelves 220A-220C, respectively, where the ordered items of interest included in the bin modules 214 in the workstation shelf 220 may be removed manually, semi-automatically, or automatically, for further processing such as for packaging. FIG. 9 illustrates an example, in which three workers are manually or semi-automatically removing the purchased items of interest from the bin module(s) in the workstation shelf 220.

In operation, the dollies 300 are controlled to retrieve bin modules 214 containing bins 216 that include ordered items from the storage shelves 210, and to move the retrieved bin modules 214 to one or more collection shelves 210A-210C on the upper level 420. In FIG. 9, three shelves on the upper level 420 are designated as collection shelves 210A-210C.

Since the elevators 400A-400C may each include a drive module 412 to be able to move on the lower level 430, any or all of the storage shelves 210 placed along an edge 420A of the upper level 420 facing the elevators 400A-400C may serve as a collection shelf. The dollies 300, perhaps in response to commands received from the control system 102, retrieve bin modules 214 from the storage shelves 210 and place them into one or more of the collection shelves 210A-210C.

The elevators 400A-400C, perhaps also in response to commands received from the control system 102, retrieve the bin modules collected at the collection shelves 210A-210C and bring them down to the lower level 430 to place them in the workstation shelves 220A-220C. As discussed above, since the elevator 400 may be configured to be movable, only one elevator 400 may be provided and moved between multiple workstation shelves 220A-220C and multiple workstations 130A-130C. Similarly, in some embodiments, the workstation shelves 220A-220C may be configured to be movable (e.g., provided with wheels) and may be moved between multiple workstations 130A-130C.

As the elevators 400A-400C lower the bin modules 214 containing purchased items to the lower level 430 and place them in the workstation shelves 220A-220C, the workers at the workstations 130A-130C retrieve purchased items from one or more of the bins 216 of the retrieved bin modules 214 and process them for packing and shipping, for example. The bin modules 214, from which the purchased items have been retrieved, are then placed back in the elevators 400A-400C and moved up to be placed into the collection shelves 210A-210C on the upper level 420. The dollies 300, again in response to commands from the control system 102 in various exemplary embodiments, retrieve the used bin modules 214 from the collection shelves 210A-210C and return them to the storage shelves 210. The storage shelves 210, to which the bin modules 214 are returned, may be those storage shelves 210 that originally held the bin modules 214 being returned, or may be other storage shelves 210 that the control system 102 may determine for achieving an efficient ASRS workspace. For example, bin modules 214 including bins 216 that contain popular (frequently ordered) items may be advantageously placed in a storage shelf 210 that is located closer to the collection shelves 210A-210C.

Figure 10:
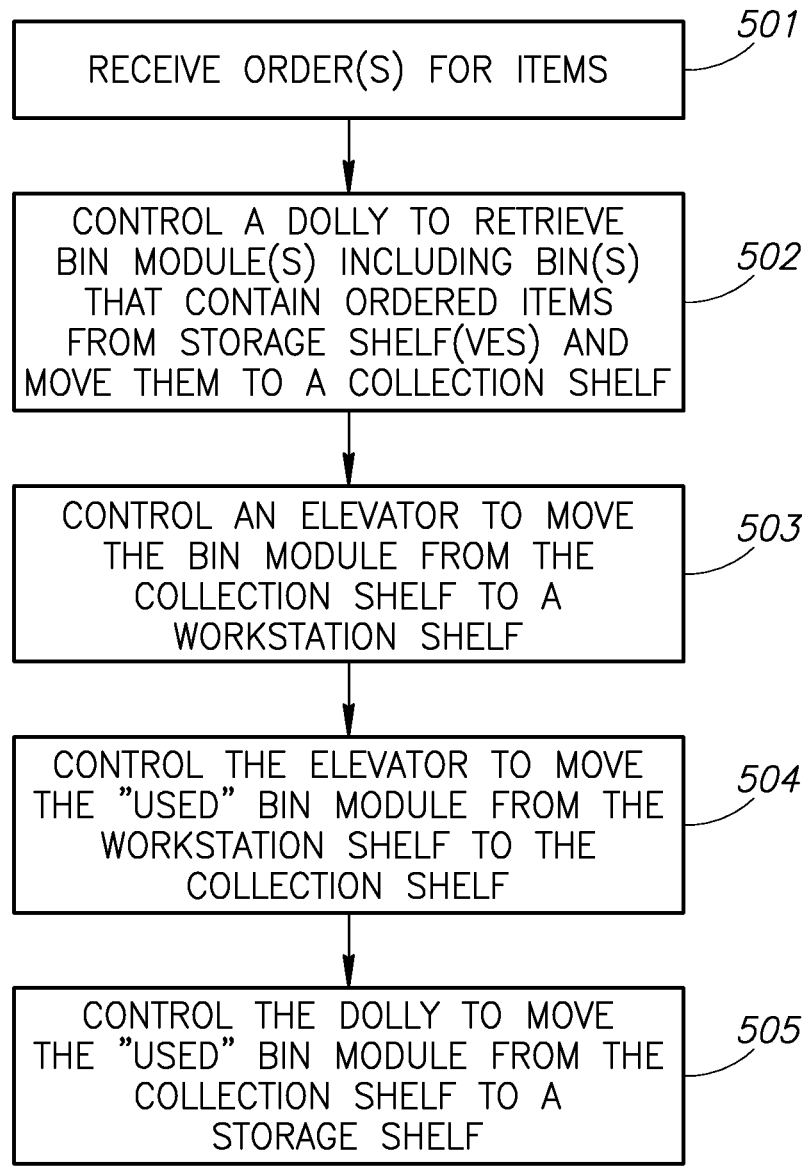
FIG. 10 is a flowchart of a method for transporting inventory using a plurality of bin modules removably supported in a plurality of storage shelves, according to some embodiments.

FIG. 10 is a flowchart of a sample method for transporting inventory using a plurality of bin modules 214 removably supported in a plurality of storage shelves 210, according to some embodiments. In step 501, a system (e.g., the control system 102 in FIG. 1) receives orders for inventory items. In step 502, the control system 102 sends control commands to the dolly(ies) 300 to retrieve bin module(s) 214 including bin(s) 216 that contain ordered items from storage shelves 210 on the upper level 420. The control commands further direct the dolly(ies) 300 to move the retrieved bin modules 214 to one or more collection shelves 210A-210C on the upper level 420.

In step 503, the control system 102 controls, via control commands, one or more elevators 400 placed on the lower level 430 to move the bin modules 214 collected in the one or more collection shelves 210A-210C to one or more workstation shelves 220 placed on the lower level 430. In one example, one elevator 400 is provided and moved on the lower level 430 so as to collect bin modules 214 from a plurality of collection shelves 210A-210C provided on the upper level 420. In another example, multiple elevators 400 (e.g., two elevators 400) are provided and each is moved between two or more collection shelves 210A-210C provided on the upper level 430 to move down the bin modules 214 collected in those collection shelves 210A-210C. In yet another example, a plurality of elevators 400 are provided adjacent to a plurality of collection shelves 210A-210C, respectively, so that each collection shelf 210A, 210B, or 210C has a designated elevator 400A, 400B, or 400C, which exclusively services the collection shelf to move the bin modules 214 collected therein.

In one example, one or more workstation shelves 220A-220C are provided on the lower level 430, and one or more workers may be assigned to work on the one or more workstation shelves 220A-220C, respectively. In another example, one worker may move between a plurality of workstations shelves 220A-220C to process the bin modules 214 collected at those workstation shelves 220A-220C. In yet another example, one worker and one movable workstation shelf 220 (provided with wheels or motorized wheels, for example) are provided, and the worker may roll the workstation shelf 220 to move between multiple elevators 400A-400C provided on the lower level 430.

While it has been described that one or more workers are present at one or more workstations 130A-130C in various embodiments, in other embodiments the workstations 130A-130C may be fully automated or semi-automated to eliminate a need for the presence of a worker. For example, a robot may be provided at any of the workstations 130A-130C, which is capable of automatically retrieving ordered items from the bin modules 214 collected at a workstation shelf 220 for further processing (e.g., packaging).

As evident from various examples described above, the system for transporting inventory according to various embodiments of the present invention is highly flexible and may be configured and arranged in various ways to meet different needs of each workspace or even different needs of each time period within the same workspace. For example, the number of dolly(ies) 300 and elevator(s) 400 to be deployed, as well as the number and configuration of storage shelves 210, collection shelves 210A-210C, workstation shelves 220A-220C, and workstations 130A-130C may be freely adjusted depending on each application.

Returning to FIG. 10, in step 504, each "used" bin module 214, from which the ordered items have been removed, is retrieved from the workstation shelf 220 and carried up by the elevator 400 to be placed back in the collection shelf 210A (or 210B or 210C) on the upper level 420. In step 505, the dolly 300 is controlled to move the "used" bin module 214 from the collection shelf 210A (or 210B or 210C) to one of the storage shelves 210 on the upper level 420.

Various other methods of transporting inventory items are possible using the system of the present invention, such as a method of replenishing the supply of inventory items into bin modules 214 at one or more workstation shelves 220A-220C and returning the replenished bin modules 214 back into the storage shelves 210.

Although the embodiment illustrated in FIG. 9 includes one lower level 430 and one upper level 420, in accordance with various other embodiments, a plurality of upper levels 420 may be provided to further increase the ASRS space and to take advantage of a high ceiling. In these embodiments, each of the upper levels 420 has a plurality of storage shelves 210, at least one collection shelf 210A, and at least one dolly 300. One or more elevators 400A-400C provided on the lower level 430 are configured to move bin modules 214 between each of the upper levels 420 and the lower level 430, and also between each of the upper levels 420.

Figure 11:
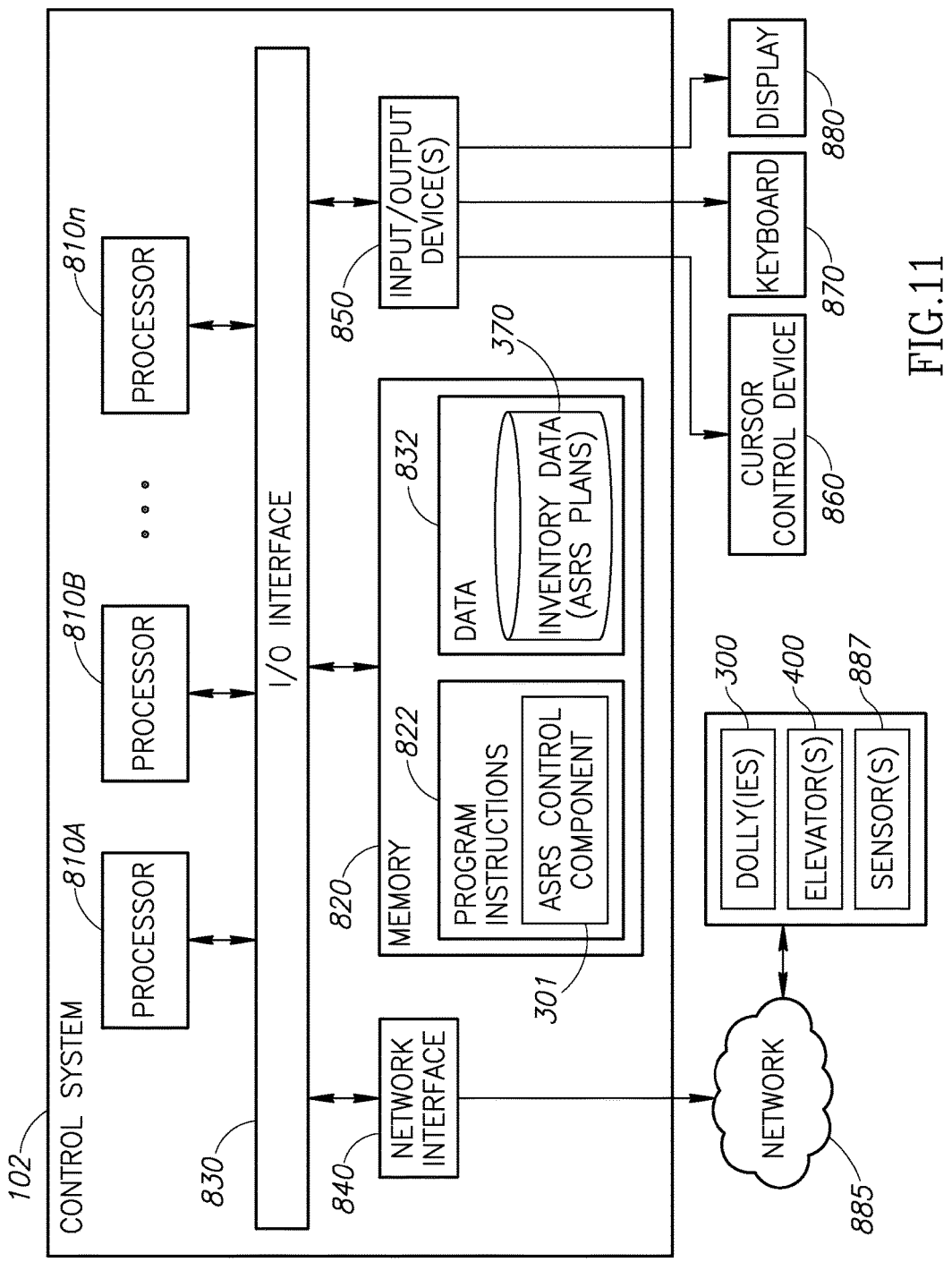
FIG. 11 is a diagram illustrating a system, including a control system connected to various components (e.g., dolly, elevators, and sensors) via a network, which is suitable for implementing various elements of the system and method for automated storage and retrieval in a materials handling facility, according to some embodiments.

Various embodiments of the system and method for transporting inventory in a materials handling facility, as described herein, may be executed on or controlled by one or more computer systems, which may interact with various other devices. FIG. 11 is one example of the control system 102 (see FIG. 1) suitable for implementing various elements of the system and method according to some embodiments.

Note that any component, action, step, or functionality described above with respect to FIGS. 1-10 may be implemented via one or more computer systems configured as a control system 102 of FIG. 11 according to various embodiments. In the illustrated embodiment, the control system 102 includes one or more processors 810 coupled to a system memory 820 via an input/output (I/O) interface 830. The control system 102 further includes a network interface 840 coupled to I/O interface 830. The control system 102 still further includes one or more input/output devices 850, such as cursor control device 860, keyboard 870, and display(s) 880, which are coupled to I/O interface 830. In some cases, it is contemplated that embodiments may be implemented using a single instance of the control system 102, while in other embodiments multiple such systems, or multiple nodes making up the control system 102 may be configured to host different portions or instances of embodiments. For example, in one embodiment some elements may be implemented via one or more nodes of the control system 102 that are distinct from those nodes implementing other elements.

In various embodiments, the control system 102 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 include an ASRS control component 301. Memory 820 stores data 832 including any of the information used in the method and system for transporting inventory as described above, such as inventory data 370 (e.g., what inventory items are located in which bins 216 of which bin modules 214 in which storage shelves 210, as well as positions of the storage shelves 210 within an inventory workspace). The inventory data 370 may further include ASRS plans for various items, which are preconfigured or dynamically configured programs for storing and retrieving various inventory items. For example, when certain inventory items are determined to be frequently retrieved and thus popular, those items may be tagged to be placed closer to one of collection shelves 210A-210C. As another example, two or more items that are determined to be frequently ordered together may be tagged to be placed in the bins 216 within the same bin module 214. These determinations will be reflected in the ASRS plans, which form part of the inventory data in memory 820.

In some embodiments, program instructions 822 and/or data 832 may be received from, sent to, or stored upon different types of computer-accessible media or on similar media, which are separate from the control system 102.

In one embodiment, I/O interface 830 may be configured to coordinate I/O traffic between processor 810, system memory 820, and any peripheral devices, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between the control system 102 and other devices attached to the network 885, such as the dolly(ies) 300, elevator(s) 400, and sensors 887. The sensors 887 may be provided on the dolly 300, on the elevator 400, or otherwise placed in the inventory workspace to indicate the condition or status of the ASRS system, such as the location of each dolly 300 or elevator 400, a temperature of the workspace, etc. The network 885 may in various embodiments include one or more networks including but not limited to Local Area Networks (LANs) (e.g., an Ethernet or corporate network), IEEE 802.11 series Wireless LANs (WLANs), Wide Area Networks (WANs) (e.g., the Internet), other wireless data networks, some other electronic data network, or some combination thereof. In various embodiments, network interface 840 may support communication via wired or wireless general data networks, such as any suitable type of Ethernet network, for example; via telecommunications/telephony networks such as circuit switch based or packet switched based 3G/4G communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more control systems 102. Multiple input/output devices 850 may be present in the control system 102 or may be distributed on various nodes of the control system 102. In some embodiments, similar input/output devices may be separate from the control system 102 and may interact with one or more nodes of the control system 102 through a wired or wireless connection, such as over network interface 840.

As shown in FIG. 11, memory 820 may include program instructions 822 including the ASRS control component 301 configured to implement any element or action of the system and method for transporting inventory as described above. In one embodiment, the ASRS control component 301 may implement the methods described above, such as the method illustrated in FIG. 10.

Specifically, when orders for inventory items are received, via the I/O devices 850 for example, the ASRS control component 301, in reference to the inventory data 370 stored in memory 820, formulate a set of commands to control the dolly(ies) 300 and elevator(s) 400. In accordance with various exemplary embodiments, a goal of the commands is to collect as many bin modules 216 including bins 214 containing ordered items at a workstation shelf 220 (or at several workstation shelves 220) as quickly as possible, such that there is no downtime at the workstation shelve(s) 220.

Specifically, the commands are written to retrieve the bin modules 214 containing bins 216 that include the ordered items from various storage shelves 210. The commands are configured to control the dolly(ies) 300 and the elevator(s) 400 to efficiently transfer the retrieved bin modules 214 to one or more collection shelves 210A-210C, and then to one or more workstation shelves 220A-220C. The ASRS control component 301 may further generate commands to control the elevator(s) 400 and dolly(ies) 300 to return the "used" bin modules 214 back into the storage shelves 210.

Any sensed information collected by the sensors 887 included in the dolly(ies) 300 or the elevator(s) 400 (e.g., location information) or collected by the sensors 887 placed throughout an inventory workspace (e.g., temperature or other environmental information) may be transmitted to the control system 102. The ASRS control component 301 may reference the collected sensed information when generating commands to control movement of the dolly(ies) 300 and the elevator(s) 400.

As discussed above, the control unit 319 of the dolly 300 and the control unit 419 of the elevator 400 may control operation of the dolly 300 and the elevator 400 in whole or in part. In these embodiments, the control units 319/419 of the dolly 300 and the elevator 400 may be considered as forming part of the control system 102. That is, the control system 102 may be formed of multiple components distributed at multiple locations in the inventory workspace, wherein the control units 319/419 of the dolly 300 and the elevator 400 may communicate with each other to together form part of the control system 102.

Still further, in addition to having the control system 102, or more specifically having the ASRS control component 301, generate and implement commands to retrieve ordered items from storage shelves 210 on a per bin module basis, the control system 102 may be configured to allow a user to manually or semi-manually input commands and save them in the memory 820. Such manual or semi-manual construction and entry of commands are enabled by suitable input/output devices 850 provided in the control system 102, as described in FIG. 11.

Those skilled in the art will appreciate that the control system 102 is merely illustrative and is not intended to limit the scope of embodiments. In particular, the computer system and devices may include any combination of hardware or software that can perform the indicated functions, including computers, network devices, Internet appliances, mobile phones, mobile tables, etc. The control system 102 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated control system 102 via inter-computer communication. Some or all of the system components or data structures may also be stored (e.g., as instructions or structured data) on a computer-accessible medium or a portable article to be read by an appropriate drive. In some embodiments, instructions stored on a computer-accessible medium separate from the control system 102 may be transmitted to the control system 102 via transmission media or signals such as electrical, electromagnetic, or digital signals, or conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a computer-readable storage medium or memory medium such as magnetic or optical media, e.g., disk or volatile or non-volatile media such as RAM (e.g. SDRAM, DDR, RDRAM, SRAM, etc.), ROM, etc.

It should be noted that the order of the blocks in the drawings, in particular the order of the blocks of a method of FIG. 10, may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system for transporting inventory, comprising:
    a plurality of storage shelves positioned on a first level, each storage shelf including a frame and a plurality of bin modules that are supported in the frame and removable along a first horizontal axis, wherein each bin module includes a first coupler and a plurality of bins for storing inventory items;
    a collection shelf positioned on the first level and including a frame configured to removably support multiple bin modules;
    a dolly positioned on the first level and including: (a) a dolly frame, (b) a drive module configured to propel the dolly on the first level, (c) an arm having a first end and a second end with a longitudinal slot provided therebetween, (d) a second coupler configured to move along the longitudinal slot of the arm and to couple to the first coupler of a bin module in either a first direction of the first end of the arm or in a second direction of the second end of the arm, (e) an actuator configured to move the second coupler along the longitudinal slot to couple to the first coupler of a bin module removably supported in one of the plurality of storage shelves when the dolly is positioned adjacent to one of the plurality of storage shelves, the actuator being further configured to remove said bin module from the one storage shelf along the first horizontal axis to the dolly frame from either the first direction or the second direction, and to move said bin module from the dolly frame to the collection shelf along the first horizontal axis when the dolly is positioned adjacent to the collection shelf and to uncouple from the first coupler of said bin module, and (f) a control unit configured to control operation of the drive module and the actuator;
    an elevator positioned on a second level that is arranged vertically different from the first level, the elevator including (I) an elevator frame, (II) a third coupler configured to extend horizontally to the collection shelf along a second horizontal axis that is perpendicular to the first horizontal axis and to couple with said bin module, (III) an actuator configured to move the third coupler along the second horizontal axis to couple to said bin module when the elevator is positioned adjacent to the collection shelf, the actuator being further configured to remove said bin module from the collection shelf along the second horizontal axis to the elevator frame, and (IV) a control unit configured to control operation of the actuator of the elevator;
    memory configured to store: (i) correspondence between the inventory items and the bin modules that include bins storing said inventory items; (ii) correspondence between the bin modules and the storage shelves that removably include said bin modules and a position of each of said bin modules in the corresponding storage shelf; and (iii) positions of the storage shelves; and
    one or more processors coupled to the memory, wherein the memory includes program instructions executable by the one or more processors to control operation of the dolly, for an inventory item in an order to be filled, by: (A) activating the drive module of the dolly to move the dolly to a position adjacent to one of the storage shelves that includes the bin module including the bin storing said inventory item; (B) controlling the actuator of the dolly to move the second coupler of the dolly along the longitudinal slot on the first horizontal axis to couple to the first coupler of said bin module including the bin storing said inventory item and to move said bin module from said storage shelf to the dolly frame; (C) activating the drive module to move the dolly to a position adjacent to the collection shelf; (D) controlling the actuator of the dolly to move the second coupler to move said bin module from the dolly frame to the collection shelf along the first horizontal axis; and (E) controlling the actuator of the elevator to extend the third coupler of the elevator along the second horizontal axis to couple to said bin module and move said bin module from the collection shelf to the elevator frame along the second horizontal axis.

2. The system of claim 1, wherein the control unit of the dolly configured to control operation of the drive module and the actuator of the dolly form part of said one or more processors of the system.

3. The system of claim 1, wherein the second coupler of the dolly has a T-shape that is parallel to the longitudinal slot.

4. The system of claim 3, wherein the arm is configured to support the bin module from underneath.

5. The system of claim 4, wherein each of the bin modules has an elongate shape with an elongate bottom and two ends, to include the plurality of bins that are arranged adjacent to each other between the two ends, and the first coupler is provided on one of the two ends of the bin module.

6. The system of claim 5, wherein the first coupler consists of at least a portion of the one end of the bin module.

7. The system of claim 1, wherein each of the bin modules has an elongate shape with an elongate bottom and two ends, to include the plurality of bins that are arranged adjacent to each other between the two ends, and the first coupler is provided on at least one of the two ends and the second coupler of the dolly is configured to engage with the first coupler provided on said end of the bin module to pull and push the bin module into and out of the dolly frame.

8. The system of claim 7, wherein the first coupler consists of at least a portion of said end of the bin module itself.

9. The system of claim 1, wherein the plurality of bin modules removably supported in each storage shelf are vertically stacked, and the actuator is further configured to move the second coupler vertically relative to the dolly frame to position the second coupler adjacent to one of the vertically stacked bin modules.

10. The system of claim 1, wherein the elevator comprises one or more arms configured to vertically move between the first level and the second level and to horizontally extend to and retract from said collection shelf on the second level when the one or more arms are positioned adjacent to said collection shelf.

11. The system of claim 10, wherein each of the bin modules has an elongate shape with an elongate bottom and two ends, to include the plurality of bins that are arranged adjacent to each other between the two ends, and the arms of the elevator are configured to engage with the two ends of the bin module to hold the bin module therebetween.

12. The system of claim 10, wherein the one or more arms of the elevator are configured to engage with a bottom of the bin module to support the bin module from underneath.

13. The system of claim 10, wherein each of the bin modules has an elongate shape with an elongate bottom, two sides, and two ends, to include the plurality of bins that are arranged adjacent to each other between the two ends, and the elevator includes one or more arms configured to engage with at least one of the sides of the bin module to move the bin module out of and into said collection shelf.

14. A method for transporting inventory, comprising:
receiving an order for an item;
controlling a dolly to move the dolly to a storage shelf that removably supports a bin module, the bin module including a first coupler and a plurality of bins with one of the plurality of bins containing the ordered item, the dolly and the storage shelf being on a first level;
controlling the dolly to retrieve the bin module from the storage shelf, wherein controlling the dolly to retrieve the bin module includes controlling an actuator of the dolly to move a second coupler along an arm of the dolly to engage the first coupler of the bin module and remove the bin module from the storage shelf along the first axis;
controlling the dolly to move the dolly to a collection shelf and to control the actuator of the dolly to move the retrieved bin module along the first axis to the collection shelf, the collection shelf being on the first level;
controlling an elevator to remove the bin module from the collection shelf along a second axis that is different from the first axis, the elevator being on a second level different from the first level;
controlling the elevator to move the bin module to a workstation shelf on the second level;
controlling the elevator to move the bin module, from which the ordered item has been removed, from the workstation shelf on the second level to the collection shelf on the first level; and
controlling the dolly to move the bin module, from which the ordered item has been removed, from the collection shelf to a storage shelf.

15. The method of claim 14, wherein two or more collection shelves are placed on the first level and two or more positions are defined on the second level respectively corresponding to the two or more collection shelves on the first level, the method further comprises:
controlling the elevator at a first position on the second level to move a bin module from a first collection shelf on the first level to the first position on the second level;
controlling the elevator to move from the first position to a second position on the second level; and
controlling the elevator at the second position on the second level to move a bin module from a second collection shelf on the first level to the second position on the second level.

16. The method of claim 15, wherein a workstation to process orders is located at one of the two or more positions on the second level, and the method further comprises controlling the elevator to collect bin modules including bins that store ordered items at said workstation.

17. The method of claim 15, wherein two or more workstations to process orders are respectively located at the two or more positions on the second level, and the method further comprises controlling the elevator to move between the two or more positions to move bin modules from the two or more collection shelves on the first level down to the respective workstations on the second level.

18. The method of claim 14, wherein a third level different from the first and second levels is provided, on which a dolly is controlled to retrieve a bin module including bins containing ordered item(s) from a storage shelf that removably supports the bin module, and the method further comprises controlling the elevator to move bin modules between the first level, the second level, and the third level.

* * * * *